US008346868B2

(12) United States Patent
Nakajima

(10) Patent No.: US 8,346,868 B2
(45) Date of Patent: Jan. 1, 2013

(54) REAL-TIME WEB SHARING SYSTEM

(75) Inventor: Kazuaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 842 days.

(21) Appl. No.: 10/536,668

(22) PCT Filed: Nov. 25, 2003

(86) PCT No.: PCT/JP03/15053
§ 371 (c)(1),
(2), (4) Date: Aug. 27, 2005

(87) PCT Pub. No.: WO2004/049180
PCT Pub. Date: Jun. 10, 2004

(65) Prior Publication Data
US 2006/0015763 A1 Jan. 19, 2006

(30) Foreign Application Priority Data
Nov. 27, 2002 (JP) .................... 2002-343721

(51) Int. Cl.
*G06F 15/16* (2006.01)
(52) U.S. Cl. .................... 709/205; 709/217; 709/203
(58) Field of Classification Search .................... 709/204, 709/203, 223; 707/8
See application file for complete search history.

(56) References Cited

U.S. PATENT DOCUMENTS

| | | | | |
|---|---|---|---|---|
| 5,944,791 A * | 8/1999 | Scherpbier | .................... | 709/218 |
| 5,956,027 A | 9/1999 | Krishnamurthy | | |
| 5,978,828 A * | 11/1999 | Greer et al. | .................... | 709/224 |
| 6,012,087 A * | 1/2000 | Freivald et al. | ................ | 709/218 |
| 6,138,150 A * | 10/2000 | Nichols et al. | ................ | 709/219 |
| 6,240,443 B1 * | 5/2001 | Suzuki et al. | .................... | 709/204 |
| 6,295,551 B1 * | 9/2001 | Roberts et al. | ................ | 709/205 |
| 6,366,933 B1 * | 4/2002 | Ball et al. | ....................... | 715/203 |
| 6,460,038 B1 * | 10/2002 | Khan et al. | ............................ | 1/1 |
| 6,681,369 B2 * | 1/2004 | Meunier et al. | ................ | 715/255 |
| 6,691,176 B1 * | 2/2004 | Narin et al. | .................... | 719/318 |

(Continued)

FOREIGN PATENT DOCUMENTS
EP 0 833 260 1/1998
(Continued)

OTHER PUBLICATIONS

Aoki, Yoshinori, "Collaborative Environment for Supporting Web Users" 2001 IEEE International Conference on Systems Man and Cybernetics; SM 2001, Tucson, AZ, Oct. 7-10, 2001, vol. 1 of 5, Oct. 7, 2001, pp. 2309-2316.

(Continued)

*Primary Examiner* — John Follansbee
*Assistant Examiner* — Madhu Woolcock
(74) *Attorney, Agent, or Firm* — Michael Best & Friedrich LLP

(57) ABSTRACT

The customer presses the Connect button (2240) on the customer terminal (1230). By this, a connection request to an operator terminal is notified to an operator terminal (1210) via the push sharing server (2100). On receiving this notification, the operator terminal (1210) changes the Respond button (2310) to the Incoming button. When the operator presses the Respond button (2310) on the operator web page (2300), the push sharing server (2100) transmits a difference notification command to the operator terminal (1210), and the operator terminal displays the same web page as the web page on the customer terminals (1230).

7 Claims, 21 Drawing Sheets

U.S. PATENT DOCUMENTS

| | | | |
|---|---|---|---|
| 6,938,212 B2 * | 8/2005 | Nakamura | 715/748 |
| 6,950,852 B1 * | 9/2005 | Kobayaghi et al. | 709/204 |
| 7,003,546 B1 * | 2/2006 | Cheah | 709/200 |
| 7,069,497 B1 * | 6/2006 | Desai | 715/205 |
| 7,100,195 B1 * | 8/2006 | Underwood | 726/2 |
| 7,127,720 B2 * | 10/2006 | Cano et al. | 719/310 |
| 7,194,546 B2 * | 3/2007 | Kameoka et al. | 709/229 |
| 2001/0016873 A1 * | 8/2001 | Ohkado et al. | 709/205 |
| 2002/0013782 A1 * | 1/2002 | Ostroff et al. | 707/10 |
| 2002/0016830 A1 * | 2/2002 | Nicolai | 709/219 |
| 2002/0046278 A1 * | 4/2002 | Hays et al. | 709/225 |
| 2002/0047864 A1 * | 4/2002 | Kumazawa et al. | 345/745 |
| 2002/0069219 A1 * | 6/2002 | Weng | 707/501.1 |
| 2002/0143813 A1 * | 10/2002 | Jellum et al. | 707/511 |
| 2002/0143878 A1 * | 10/2002 | Birnbaum et al. | 709/205 |
| 2002/0155848 A1 | 10/2002 | Suryanarayana | |
| 2003/0023718 A1 * | 1/2003 | Smith, II | 709/224 |
| 2003/0105819 A1 * | 6/2003 | Kim et al. | 709/205 |
| 2004/0107405 A1 * | 6/2004 | Schein | 715/530 |

FOREIGN PATENT DOCUMENTS

| | | |
|---|---|---|
| EP | 1 022 664 | 7/2000 |
| GB | 1 022 664 A2 * | 7/2000 |
| JP | 10-116238 | 5/1998 |
| JP | 11-120134 | 4/1999 |
| JP | 2000-112862 | 4/2000 |
| JP | 2000-215173 | 8/2000 |
| JP | 2001-243154 | 9/2001 |
| JP | 2002-324037 | 11/2002 |
| WO | WO 02/15026 | 2/2002 |

OTHER PUBLICATIONS

Supplementary European Search Report, European Patent Application No. 03 77 4230, completed Nov. 28, 2006.

First Office Action, Chinese Patent Application No. 200380104349.X, dated Dec. 8, 2006 (with English Translation).

\* cited by examiner

FIG. 6

```
function OnSharePost(tagId)
{
        if (bStopFlag == true){
                return true:
        } parent.frames['Header'].oldUrl="";
        parent.frames['Header'].bSet=false;
        strEval = "DoSharePost('"+tagId+"')";
        parent.frames['Header'].ClientAction
                ('EVAL;1;UrlPush;'+strEval+';');
        return true:
}
```

DIFFERENCE NOTIFICATION COMMAND GENERATING FUNCTION

FIG. 7

```
function ChangeSubmit(elm, tagId)
{
        re = new RegExp("OnSharePost","i");
        tagId = "../UrlPush/"+tagId;
        var funcNew =
                " (parent.frames['Header'].OnSharePost('"+tagId+"'))";
        var func = funcNew:
        var prefunc = new String(elm.getAttribute('onsubmit'));
        if (prefunc != "null"){
                if (prefunc.search(re) == -1){
                        func = prefunc+"anonymous();"+func;
                }else{
                        return:
                }
        }
        func = new Function (func):
        elm.onsubmit = func:
}
```

REGISTERING FUNCTION WHICH REGISTERS A DIFFERENCE
NOTIFICATION COMMAND GENERATING FUNCTION AS A HOOK FUNCTION

FIG. 8

```
function DoSharePost(tagId)
{
        target = FindElement(tagId);
        if (target == null){
                return:
        }
        bStopFlag = true:
        target.submit():
        bStopFlag = false:
        bSet = false:
}
```

DIFFERENCE NOTIFICATION COMMAND
EXECUTING FUNCTION

FIG.22

```
htmltag=doc.all.tags('HTML')(0);
htmltag.setAttribute('xmlns:v','urn:schemas-microsoft-com:vml',false);
bodytag=doc.all.tags('BODY')(0);
divtag=doc.createElement('DIV');
dictag.innerHTML='<FONT><BR></FONT><style>v\\:*{behavior:url(#dafault#VML);}</style>';
bodytag.appendChild(divtag);
// The process above enables drawing in the content frame.
// This process enables additional drawing of all tags written in VML.

divicontag = doc.createElement('div');
divcontag.innerHTML = "<SPAN ID='F00003' STYLE='position:absolute; top;51 left:5;' onMouseDown =
\"parent.frames['Header'].ShareIconMouseDown('../UrlPush/F00003','F0003',event)\
"><IMG SRC='"+strPointerUrl+"' ALT=' SHARED POINTER
','></SPAN>";
bodytag.appendChild(divicontag);
// The process above adds a shared pointer.
// Clicking the mouse button calls ShareIconMouseDown.
```

DRAWING SCRIPT

REAL-TIME WEB SHARING SYSTEM

This application claims the benefit of International Patent Application No. PCT/JP2003/015053 filed 25 Nov. 2003, which claims priority of Japanese Patent Application No. 2002-343721, filed 27 Nov. 2002.

FIELD OF THE INVENTION

The present invention relates to a system which enables sharing of a web page being displayed on a plurality of terminals in real-time so that an operator can perform various operations on the web page on behalf a customer, and more particularly, to a real-time web sharing system which enables real-time sharing of a web page without requiring any alteration of the drawing engines of existing web browsers and/or web contents.

DESCRIPTION OF THE RELATED ART

One conventional method of sharing a web page in real-time is to share a screen (for example, "WebEx Meeting Center," from WebEx Communications, Inc., [online]; refer to an Internet URL: http://www.webex.com, as searched on Nov. 21, 2002; hereinafter referred to as "Prior Art 1"). This method provides a special environment on the own terminal and the other party's terminal, respectively, and displays the same web screen in this environment on these terminals, thereby enabling sharing of information on a web page.

Another conventional method of sharing a web page in real-time is to use a dedicated shared browser (for example, "Web Coordinate," [online], released in 2000 from Fujitsu Hokuriku Systems Ltd.; refer to an Internet URL: www.fjh.fujitsu.com/webcd/merit.html, as searched on Nov. 21, 2002; hereinafter referred to as "Prior Art 2"). This method provides a special environment to run a dedicated browser on the own terminal and the other party's terminal, respectively, and displays the same web screen in the dedicated browsers in these environments. By this, the web page being displayed on the own terminal and the other party's terminal can be shared in real-time (for example, refer to Japanese Patent Laying-Open No. 1999-120134 Official Gazette; hereinafter referred to as "Prior Art 3").

Another conventional method of using an existing web browser to share a web page in real-time is to customize the content so that the web page can be shared (for example, "Real-time Communication System," [online], released from NEC Soft, Ltd.; refer to an Internet URL: www.necsoft.com/solution/concentpro/, as searched online on Nov. 21, 2002; hereinafter referred to as "Prior Art 4"). In this method, a communication means to achieve real-time synchronization between a web page displayed on customers' terminals and a web page displayed on an operator's terminal is incorporated in the script in the web page content. Furthermore, a script to enable sharing of input data is incorporated in the content, so that the entry format on the web page being displayed on an operator's terminal will display the same information as that entered on the entry format on the web page being displayed on a customers' terminals (to share the input data).

Yet another conventional method of enabling sharing of a web page between terminals is to incorporate a page manager which can detect changes to the web page into a web page for loading into a browser (for example, refer to Japanese Patent Laying-Open No. 2000-215173 Official Gazette; hereinafter referred to as "Prior Art 5").

However, the prior art methods which use a dedicated web screen or a dedicated browser have the problem that a web page cannot be shared easily.

The prior art methods which customize the content of a web page to enable sharing of the web page requires an additional content building effort and provision of shared web services separately from conventional web services. This requirement very often leads to an increased cost due to this additional building effort (development cost) and a longer time before the release of a content service. There is also the problem that an additional task is required to separate contents for shared services from contents for usual services, sometimes inhibiting a smooth launch of a communication service.

In cases where a conventional service is applied as is, there is an additional problem that a screen sharing tool must have a relatively low response performance or a dedicated browser.

Furthermore, when a customer utilizing a usual web service wants to call up an operator at the service provider for consultation or inquiry about the service, the prior art methods entail the problem that the customer is forced to go through complicated operations because the customer and the operator need to share certain information using a screen sharing tool or dedicated browser.

Finally, the method provided by Prior Art 5, in which the page manager is configured in a static manner, have the problem that it takes a long time before an update of a shared form is detected and the update is reflected in the same form on other terminals.

It is therefore the object of the present invention to solve the above-described problems by providing a method of achieving real-time sharing of a web page simply by modifying the user interface of a conventional browser without requiring any additional content building effort.

SUMMARY OF THE INVENTION

The first aspect of the present invention to solve the above-described problems is a system which enables sharing of a web page being viewed on a plurality of terminals, comprising a server provided with a means to transmit a detecting script which detects an update to the web page and an updating script which updates the web page and a means to transmit update information which notifies an update to a web page, such information being sent from a prescribed terminal, to other terminals which are displaying the same web page as said prescribed terminal; and terminals each provided with a receiving means to receive the detecting script and the updating script which are sent from said server, a means to cause the received detecting script to detect an update to the web page being displayed and, if any, generate update information which notifies the result of the update and to transmit the resultant update information to said server, and a means to cause the updating script to update the web page based on the received update information.

The second aspect of the present invention to solve the above-described problems comprises: said server having a means to transmit an update detecting script which detects an update to a part provided on said web page, an incorporating script which incorporates this update detecting script into the web page, and a part updating script which updates a part provided on the web page, and a means to transmit the part update information which notifies the update to the part provided on the web page, such information being sent from a prescribed terminal, to other terminals which are displaying the same web page as said prescribed terminal; and said terminals each having a means to receive the script and the part updating information which are transmitted from said server; a means to cause the incorporating script to incorporate said update detecting script into the web page, cause said update detecting script to detect an update to a part on said web page, and to generate and transmit to said server part update information which notifies the content of the update; and a means to cause said part updating script to update the part on the web page based on said received part update information.

The third aspect of the present invention to solve the above-described problems comprises an update to a part provided on said web page being a scroll or resize of said web page or an update of a value in the entry form on said web page.

The fourth aspect of the present invention to solve the above-described problems comprises said server having a storing means to store identification information, which identifies said terminals individually, in association with the update information and part update information sent from the individual terminals corresponding to the identification information; a means to cause said storing means to store said update information and part update information in association with the identification information of said terminals; a means to, when a prescribed terminal logs in using said identification information, retrieve from said storing means the update information and part update information associated with the same identification information as said login identification information; and a means to first transmit said retrieved update information and then transmit said retrieved part update information to said prescribed terminal.

The fifth aspect of the present invention to solve the above-described problems comprises said server having a means to, when receiving a connection request which requests a connection from a prescribed terminal to other terminal, transmit said connection request to such other terminal; a means to, when receiving from said other terminal a notification that said other terminal is ready to respond to the connection request, retrieve from said storing means the update information and part update information associated with the identification information of said prescribed terminal; and a means to first transmit said retrieved update information and then transmit said retrieved part update information to said prescribed terminal.

The sixth aspect of the present invention to solve the above-described problems comprises: said server having a means to transmit a pointer script which incorporates tags for displaying a pointer to be shared on the web page between the terminals and which obtains the movement location for the pointer, and a moving script which moves the pointer, and a means to transmit the location information which notifies the movement location for the pointer on the web page, such information being sent from the prescribed terminal, to other terminals which are displaying the same web page as said prescribed terminal; and said terminals each having a means to receive the pointer script and location information which are sent from said server, a means to cause said pointer script to incorporate the tags for sharing the pointer into the web page, obtain the location of the pointer after movement, and transmit to said server the location information which notifies the location thus obtained; and a means to cause said moving script to move the pointer on the web page based on said received location information.

The seventh aspect of the present invention to solve the above-described problems is a terminal of a real-time web sharing system which enables real-time sharing of a web page via a remote server, comprising a means to receive a detecting script which detects an update to the web page, an updating script which updates the web page, and update information which notifies the update to the web page, all of these scripts being sent from a server; a means to cause said received detecting script to detect an update to the web page being displayed and, if any, generate update information which notifies the result of the update and to transmit the resultant update information to said server; and a means to cause the updating script to update the web page based on the update information which has been received via said receiving means.

The eighth aspect of the present invention to solve the above-described problems comprises said terminals each having a means to receive an update detecting script which detects an update to a part provided on said web page, an incorporating script which incorporates this update detecting script into the web page, and a part updating script which updates a part provided on the web page, all of these scripts being sent from a server; a means to cause the received incorporating script to incorporate said update detecting script into the web page, cause said update detecting script to detect an update to a part on said web page, and to generate and transmit to said server part update information which notifies the content of the update; and a means to cause said part updating script to update the part provided on the web page based on said received part update information.

The ninth aspect of the present invention to solve the above-described problems comprises an update to a part provided on said web page being a scroll or resize of said web page or an update of a value in the entry form on said web page.

The tenth aspect of the present invention to solve the above-described problems comprises said terminal having a means to receive a pointer script, to be sent from said server, which incorporates tags for displaying a pointer to be shared on the web page between the terminals and which obtains the movement location for the pointer, a moving script which moves the pointer, and location information which notifies the movement location for the pointer on the web page; a means to cause said pointer script to incorporate the tags for sharing the pointer into the web page, obtain the location information for the pointer after movement, and transmit to said server the location information which notifies the location thus obtained; and a means to cause said moving script to move the pointer on the web page based on said received location information.

The eleventh aspect of the present invention to solve the above-described problems is a server of a system which enables sharing of a web page in real-time being viewed between a plurality of terminals, comprising a means to receive the update information which notifies an update to a web page and the part update information which notifies an update to a part provided on the web page, both the update information being sent from a prescribed terminal; a storing means to store said identification information which identifies said prescribed terminal, in association with said received update information and part update information; a means to cause said storing means to store said identification information which identifies said prescribed terminal, in association with said received update information and part update information; a means to, when other terminal logs in using the identification information of said prescribed terminal, retrieve from said storing means the update information and part update information associated with the same identification information as said login identification information: and a means to first transmit said retrieved update information and then transmit said retrieved part update information to said other terminal.

The twelfth aspect of the present invention to solve the above-described problems comprises said server having a means to, when receiving a connection request which requests a connection from a prescribed terminal to other terminal, transmit said connection request to such other terminal; a means to, when receiving from said other terminal a notification that said other terminal is ready to respond to the connection request, retrieve from said storing means the update information and part update information associated with the identification information of said prescribed terminal; and a means to first transmit said retrieved update information and then transmit said retrieved part update information to said prescribed terminal.

The thirteenth aspect of the present invention to solve the above-described problems is a program, comprising realizing in each terminal of a system which enables real-time sharing of a web page via a server; a function which detects an update to a web page being displayed on the own terminal; a function which generates update information which notifies the result of the update to a remote server; and a function which updates the web page being displayed on the own terminal based on the update information sent from said server.

The fourteenth aspect of the present invention to solve the above-described problems comprises said program realizing a function which incorporates into said web page a detecting function which detects an update to a part provided on a web page; a function which, when said detecting function detects an update to a part provided on said web page, generates and transmit to said server part update information which notifies the content of this update; and a function which updates a part provided on a web page on the own terminal based on the part update information sent from said server.

The fifteenth aspect of the present invention to solve the above-described problems comprises said program realizing a function which incorporates into the web page tags for displaying a pointer to be shared on the web page between terminals; a function which, when said pointer on the web page moves, obtains and notifies to said server the location information for the pointer after movement; and a function which moves said pointer on a web page based on the location information notified from said server.

The sixteenth aspect of the present invention to solve the above-described problems is a method of sharing a web page in real-time between a plurality of terminals by using existing browsers, comprising enabling sharing of a web page in real-time without requiring alteration of the web page in advance or without requiring alteration of the display or the content rewriting module of a browser, by linking a web page for sharing and a web page for control with each other by displaying these web pages on the screen divided into frames or in browsers in parent-child relationship; causing a script in the control frame to detect a change in the address of the shared page; assigning, at this timing, from the control frame to the sharing frame a hook function which hooks a sharing event and identification information which designates what will be shared; if said sharing event occurs, generating and notifying from a server to the browsers on other terminals notification information which notifies the event that has occurred; and invoking a function which executes the function hooked to the targets having the same identification information.

The seventeenth aspect of the present invention to solve the above-described problems is a method of sharing in real-time a web page being displayed on a first terminal and a second terminal via a remote server, comprising the steps of: said server transmitting to the first terminal a detecting script which detects an update to a web page and transmitting to said second terminal an updating script which updates a web page; said first terminal receiving the detecting script sent from said server and causing this received detecting script to detect an update to a web page; said second terminal receiving the updating script sent from said server; said first terminal, if said detecting script detects an update to a web page, generating and transmitting to said server update information which notifies the result of the update; said server transmitting the update information sent from the first terminal to the second terminal; and said second terminal causing said received updating script to update the web page based on the update information sent from said server.

The eighteenth aspect of the present invention to solve the above-described problems comprises said real-time web sharing method having the steps of: said server transmitting to the first terminal an update detecting script which detects an update to a part provided on a web page and an incorporating script which incorporates this update detecting script into the web page and transmitting to the second terminal an updating script which updates a web page; said first terminal receiving the detecting script and incorporating script sent from said server; said second terminal receiving the updating script sent from said server; said first terminal causing said received incorporating script to incorporate said update detecting script into said web page; said first terminal, if the update detecting script detects an update to said part provided on the web page, generating and transmitting to said server part update information which notifies the content of this update; said server transmitting the part update information sent from the first terminal to the second terminal; and said second terminal causing said received updating script to update the part provided on the web page based on the part update information which has been sent from said server.

The nineteenth aspect of the present invention to solve the above-described problems comprises said real-time web sharing method using an additional third terminal and having the steps of: said server storing the identification information of said first terminal in association with said received update information and part update information; said third terminal logging into said server using the same identification information as the identification information of said first terminal; said server retrieving the update information and part update information associated with the same identification information as the said login identification information; said server first transmitting said retrieved update information and then transmitting said retrieved part update information; and said third terminal first updating the web page and then updating the part on the web page, based on the update information and part update information, respectively, sent from said server.

The twentieth aspect of the present invention to solve the above-described problems comprises the real-time web sharing method having the steps of: said first terminal detecting that a Connect button which calls said second terminal has been pressed; said first terminal, when said Connect button is pressed, notifying said server a connection request which requests a connection with said second terminal; said server, when receiving the notification of the connection request from said first terminal, transmitting this notification to second terminal; said second terminal, when receiving the notification of the connection request from said server, enabling a Respond button which responds to this connection request and detecting the pressing of said Respond button; said second terminal, when detecting the pressing of said Respond button, notifying said server that the terminal is ready to respond to the connection request; said server, when receiving the notification from said second terminal that the terminal is ready to respond to the connection request, retrieving the update information and part update information associated with the identification information of said first terminal; said server first transmitting said retrieved update information and then transmitting said retrieved part update information; and said second terminal first updating the web page and then updating the part on the web page, based on the update information and part update information, respectively, sent from said server.

The twenty-first aspect of the present invention to solve the above-described problems comprises the real-time web sharing method having the steps of: said server transmitting a pointer script, which incorporates tags for displaying a pointer to be shared on the web page between the terminals and which obtains the movement location for the pointer, and a moving script which moves the pointer; said first terminal receiving the pointer script sent from said server; said second terminal receiving the moving script sent from said server; said first terminal causing said received pointer script to incorporate the tags of the pointer to be shared between the terminals into said web page; said first terminal causing said pointer script to obtain the movement location for said pointer and transmit the location information thus obtained to said server; said server forwarding the location information sent from said first terminal to said second terminal; and said second terminal causing said moving script to move the pointer being displayed on said web page, based on the location information sent from said server.

BRIEF DESCRIPTION OF THE DRAWINGS

FIG. 6 is a diagram showing a generating function which generates a difference notification command;

FIG. 7 is a diagram showing a registering function;

FIG. 8 is a diagram showing an executing function which executes a difference notification command;

FIG. 22 is a diagram showing a drawing script.

DESCRIPTION OF THE PREFERRED EMBODIMENT

Figure 1:
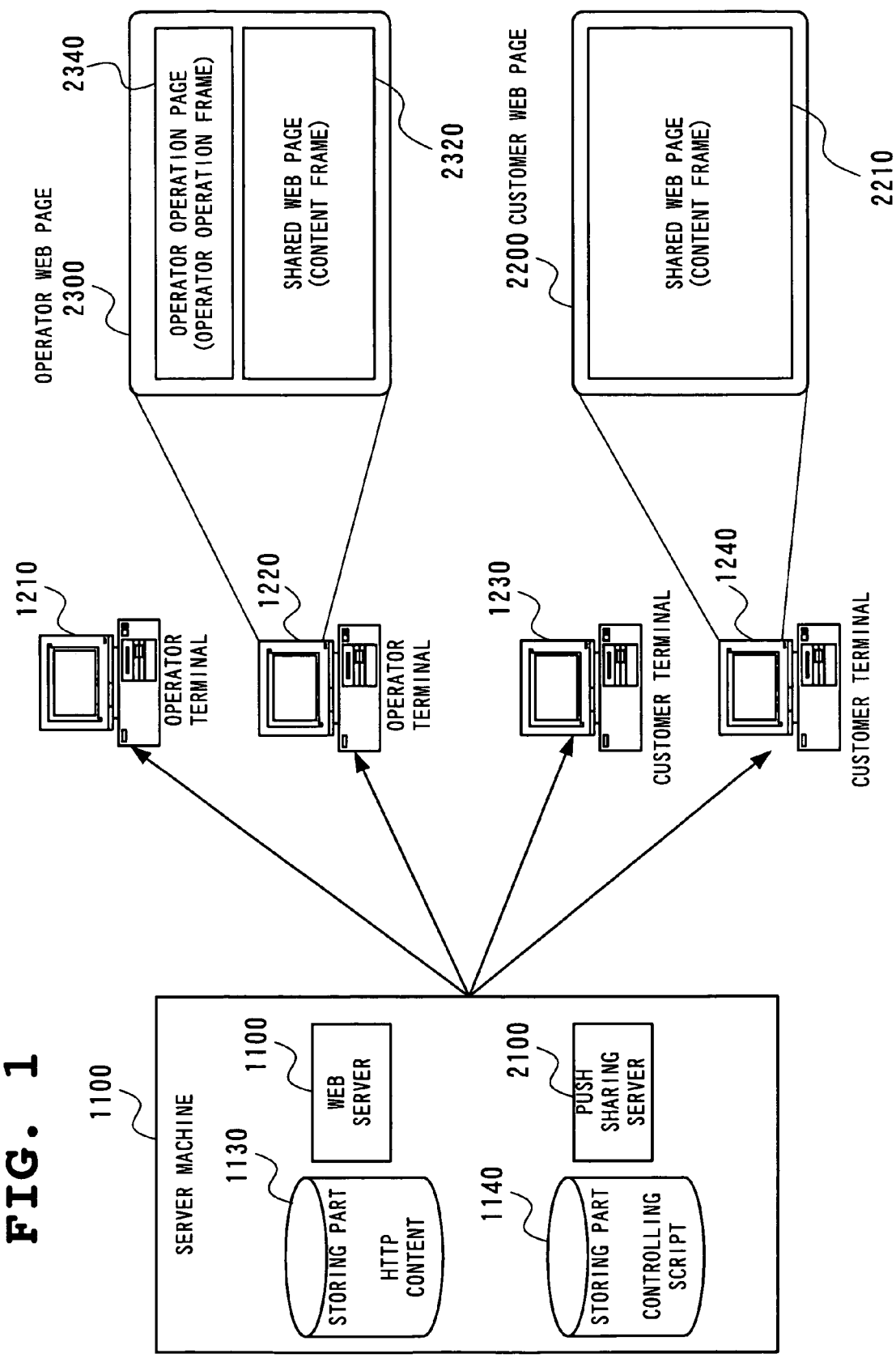
FIG. 1 is a block diagram showing a real-time web sharing system.
Figure 2:
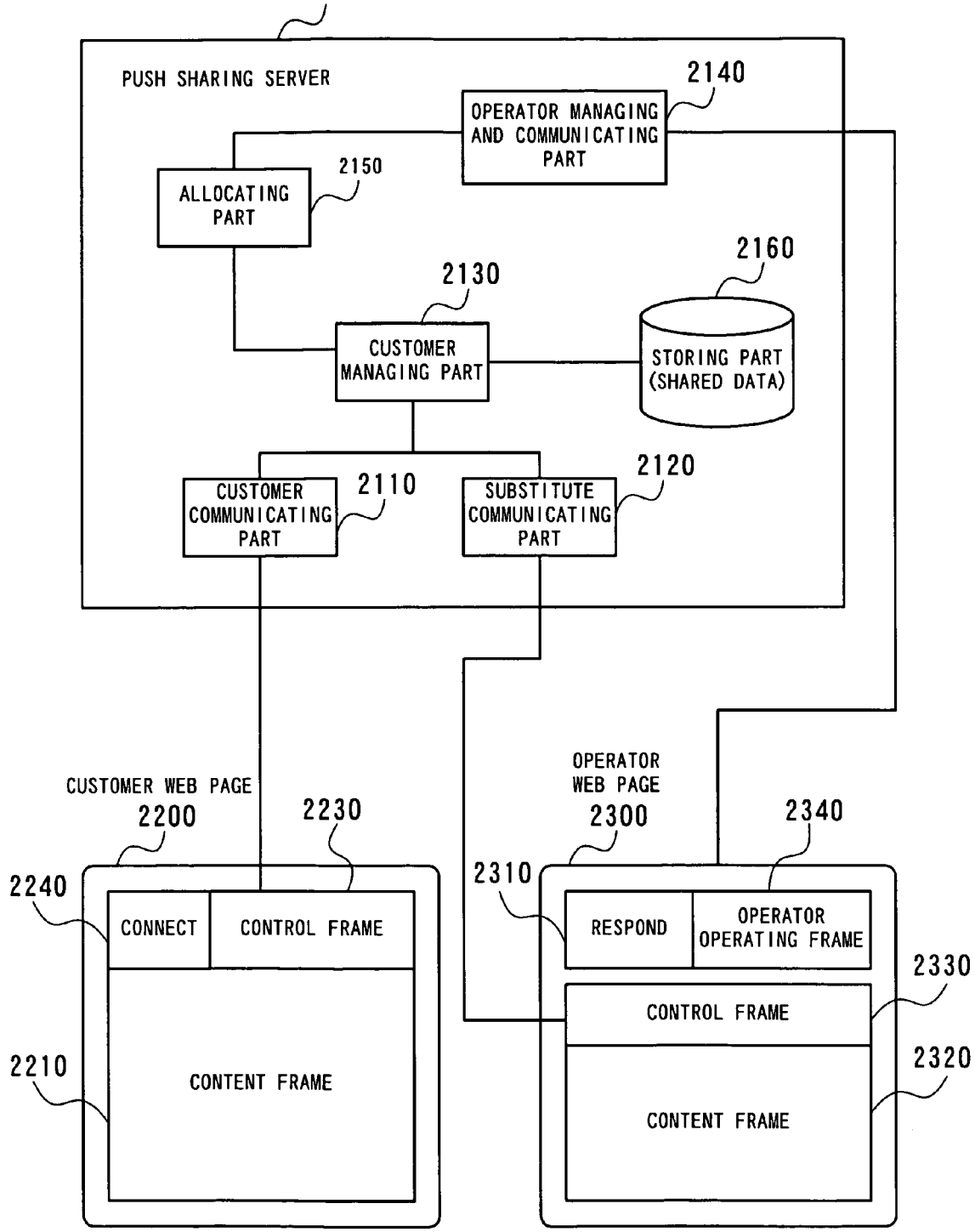
FIG. 2 is a block diagram showing a push sharing server.
Figure 3:
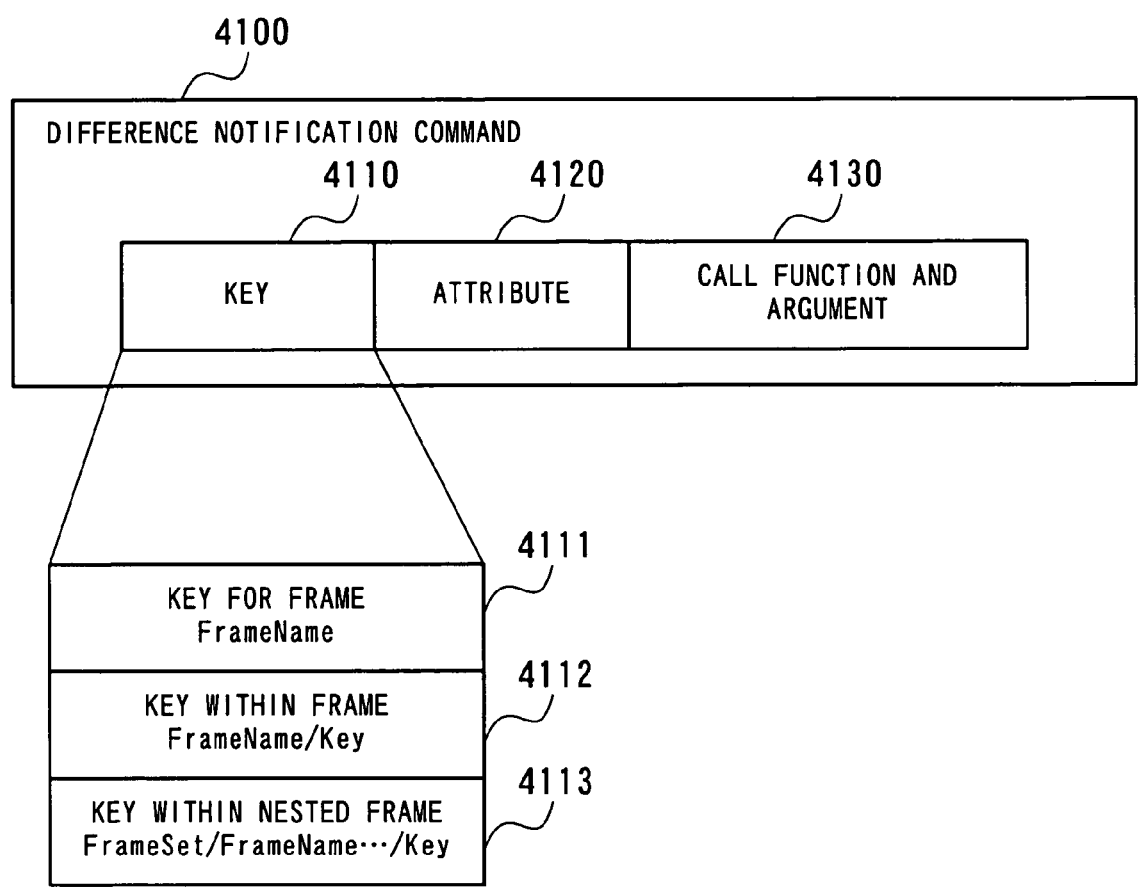
FIG. 3 is a diagram illustrating the configuration of a difference notification command.

FIG. 1 is a block diagram showing the configuration of a real-time web sharing system according to the first embodiment of the present invention. FIG. 2 is a block diagram showing a push sharing server. FIG. 3 is a diagram illustrating the configuration of a difference notification command.

A real-time web sharing system according to the first embodiment of the present invention comprises a server group 1100, consisting of a web server 1100, a push sharing server 2100, a first storing part 1130 which stores HTTP contents, and a second storing part 1140 which stores a controlling script; operator terminals 1210 and 1220; and customer terminals 1230 and 1240 which are installed in general households, local offices and the like. The server group 1100, the operator terminals 1210 and 1220, and the customer terminals 1230 and 1240 are connected among one another via a telecommunication line, such as the Internet.

The web server 1100 provides usual web services, and transmits an HTTP content stored in the storing part 1130 when accessed from a customer terminal 1230, 1240 or an operator terminal 1210 or 1220. The web server 1100 also transmits a controlling program (controlling script) stored in the storing part 1140 to a customer terminal 1230, 1240 or an operator terminal 1210 or 1220. This transmission of the HTTP content from the web server 1100 causes a web-page to be displayed on the screen of a customer terminal 1230, 1240 or operator terminal 1210 or 1220.

The push sharing server 2100 controls sharing of a web page and other data among the operator terminals 1210, 1220 and the customer terminals 1230 and 1240, and comprises a customer communicating part 2110, a substitute communicating part 2120, a customer managing part 2130, an operator managing and communicating part 2140, an allocating part 2150, and a storing part 2160.

The customer communicating part 2110 is used for communication with a customer terminal 1230, 1240, and transmits a difference notification command sent from the customer managing part 2130 to a customer terminal 1230, 1240. The difference notification command controls the browser of the customer terminal 1230, 1240 and causes the customer web page 2200 being displayed in the browser to be updated.

A difference notification command consists of a key 4110, an attribute 4120, and a calling function and argument 4130 as shown in FIG. 3.

The field for the key 4110 contains a frame name. By displaying a frame name in this field, changes can be identified on a frame-to-frame basis, leading to efficient identification of a change made to a web page. In addition, the key 4110 is represented in a hierarchical fashion. For example, a slash ("/") indicates a level below, as shown in 4112 in FIG. 3. Suppose, for example, that the frame of the top page is named "A" and includes a part named "B" (which may be an entry form, scroll bar, window size, button or the like), then this key is represented as "frame A/B." The hierarchical representation of keys facilitates identification of a part or other element associated with a particular frame. Furthermore, when a change is made to the frame at the top level (i.e., the URL of an entire web page), a difference notification command containing a key for which the frame name of the top level is indicated can be removed easily because of the hierarchical representation of keys.

If a frame is nested, the nested frame is represented using as many slashes as the depth in the hierarchy, as shown in 4113 in FIG. 3. In other words, more slashes mean deeper levels in the hierarchy. The key 4110 is also used as a marking indicating which difference notification command contains the same key as the one stored in the storing part 2160, thereby facilitating an overwriting (updating) process. By this, it can be ensured that the storing part 2160 always stores the latest version of a difference notification command containing a particular key.

The field for the attribute 4120 contains the value which indicates whether a difference notification command should be transmitted to other terminals only or transmitted to own terminal as well (local echoing). For example, the value "1" for the attribute 4120 indicates that the difference notification command will be transmitted to other terminals.

The field for the calling function and argument 4130 contains a function or argument that the other party terminal should execute.

The customer communicating part 2110 receives a difference notification command from a customer terminal 1230, 1240 and transmits the received difference notification command to the customer managing part 2130.

The substitute communicating part 2120 communicates with an operator terminal 1210, 1220 and transmits a difference notification command sent from an operator terminal 1210, 1220 to the customer managing part 2130. The substitute communicating part 2120 also transmits to an operator terminal 1210, 1220 a difference notification command sent from the customer managing part 2130.

The customer managing part 2130 receives a difference notification command from the customer communicating part 2110 or the substitute communicating part 2120, and stores in the storing part 2160 the received difference notification command and the ID assigned to the terminal which is the sender of the difference notification command (for example, user ID or user name). The customer managing part 2130 also forwards a difference notification command to a communicating part different from the sender communicating part. For example, if the customer managing part 2130 receives a difference notification command from the customer communicating part 2110, the customer managing part 2130 may forward the difference notification command to the substitute communicating part 2120 rather than the customer communicating part 2110.

In addition, the customer managing part 2130 stores in the storing part 2160 the ID assigned to the terminal which is the sender of the difference notification command in association with the ID assigned to the terminal which is the receiver of the difference notification command. By associating the ID's assigned to the sender and receiver terminals, it becomes possible to identify the terminals currently sharing a web page.

When the customer managing part 2130 detects a connection request from a customer terminal 1230, 1240 to an operator terminal 1210, 1220, the customer managing part 2130 issues to the allocating part 2150 a request for allocation of an operator terminal.

The operator managing and communicating part 2140 is responsible for communication with an operator terminal 1210, 1220. When receiving from the allocating part 2150 a request for connection with a prescribed operator terminal, the operator managing and communicating part 2140 notifies the target operator terminal of the occurrence of a connection request from a customer terminal.

On receiving a request for allocation of an operator terminal from the customer managing part 2130, the allocating part 2150 searches for an operator terminal which is currently not connected with a customer terminal. The allocating part 2150 also notifies the found operator terminal of the occurrence of a connection request from a customer terminal via the operator managing and communicating part 2140. On receiving a notification from the operator terminal that the terminal is ready to respond to the connection request, the allocating part 2150 transmits to the operator terminal the ID assigned to the customer terminal via the operator managing and communicating part. The operator terminal which has received the ID logs in using the received ID via the substitute communicating part 2120 of the push sharing server 2100.

In the storing part 2160, the ID of the customer terminal is stored in association with the difference notification command sent from the customer terminal or operator terminal. The association of the difference notification command with the ID of the customer terminal is made in a hierarchical fashion, as described above.

The operator terminals 1210, 1220 display an operator web page 2300 as shown in FIG. 1.

The operator web page 2300 consists of a Respond button 2310 for the operator to respond to a connection request from a customer terminal 1210, 1220, a content frame 2320, a control frame 2330, and an operator operating frame 2340.

The Respond button 2310 becomes active (enabled) when a connection request is received from the push sharing server 2100. Pressing the Respond button 2310 causes a notification that the terminal is ready to respond to the connection request to be transmitted to the push sharing server 2100.

The content frame 2320 displays a web page provided by the web server 1100 and a web page subjected to real-time web sharing according to the present invention.

The control frame 2330 displays a command line field, selection buttons and other elements for the operator to operate the web page being displayed in the content frame 2320, along with a module which enables sharing of a web page as described later.

The operator operating frame 2340 responsible for operations required for sharing a web page, such as generating a control frame 2330 when a connection request is received from a customer terminal 1230, 1240 via the push sharing server 2100 and removing the control frame 2330 when a disconnection request is received from the operator.

The customer terminals 1230 and 1240 display a customer web page 2200 as shown in FIG. 1.

The customer web page 2200 consists of a Connect button 2240 for the customer terminal to connect with an operator terminal 1210 or 1230, a content frame 2210, and a control frame 2230.

The content frame 2210 displays a web page provided by the web server 1100.

The control frame 2230 displays a command line field, selection buttons and other elements for the customer to operate the web page being displayed in the content frame 2210, along with a module which enables sharing of a web page as described later. The content frame 2210 and the control frame 2230 display the same contents as the content frame 2320 and control frame 2330 of an operator terminal 1210, 1220, respectively.

The modules incorporated into the control frame of each terminal will now be described in detail with reference to FIGS. 4 and 5.

Figure 4:
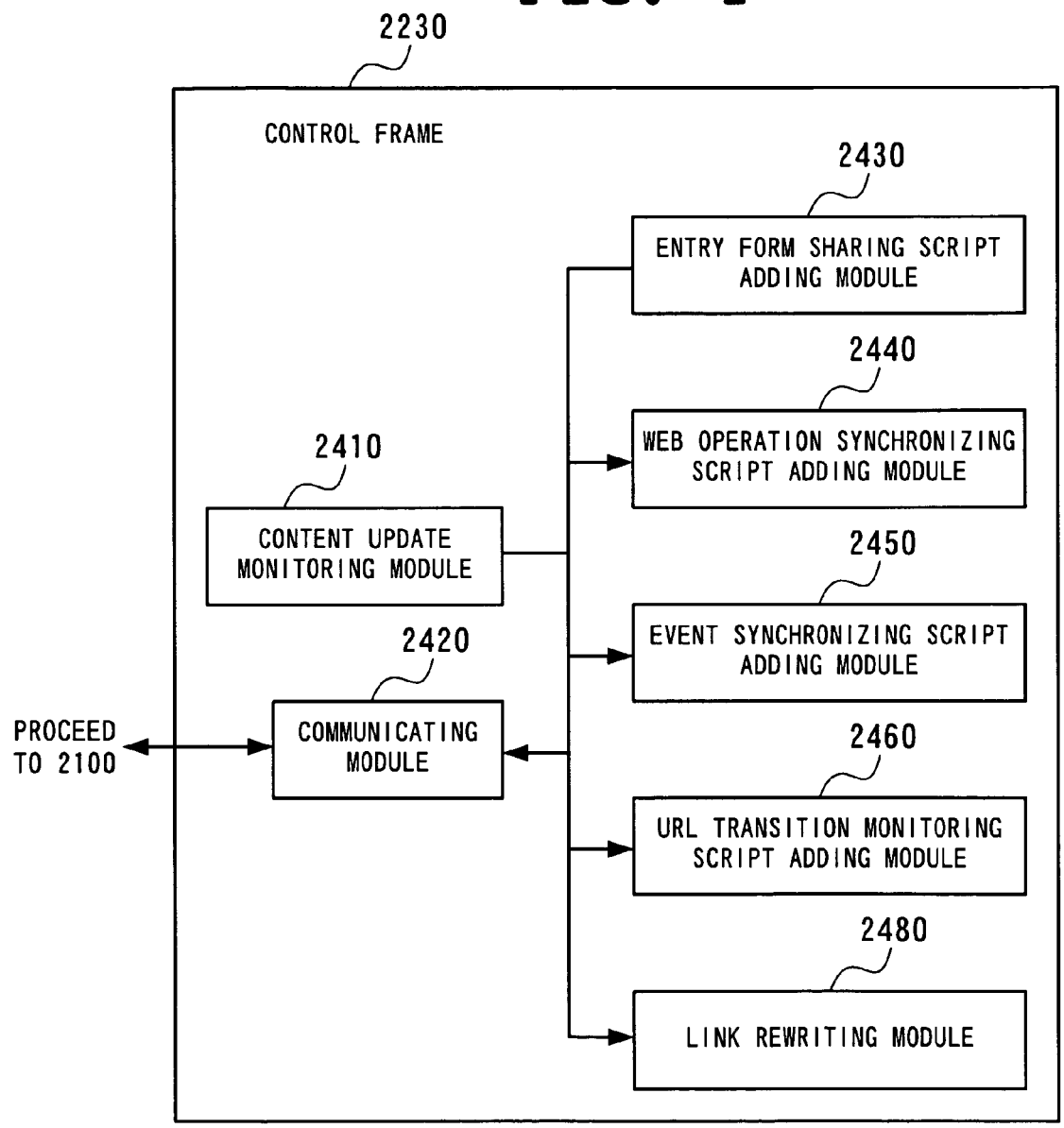
FIG. 4 is a diagram showing the modules incorporated in the control frame of a customer terminal.
Figure 5:
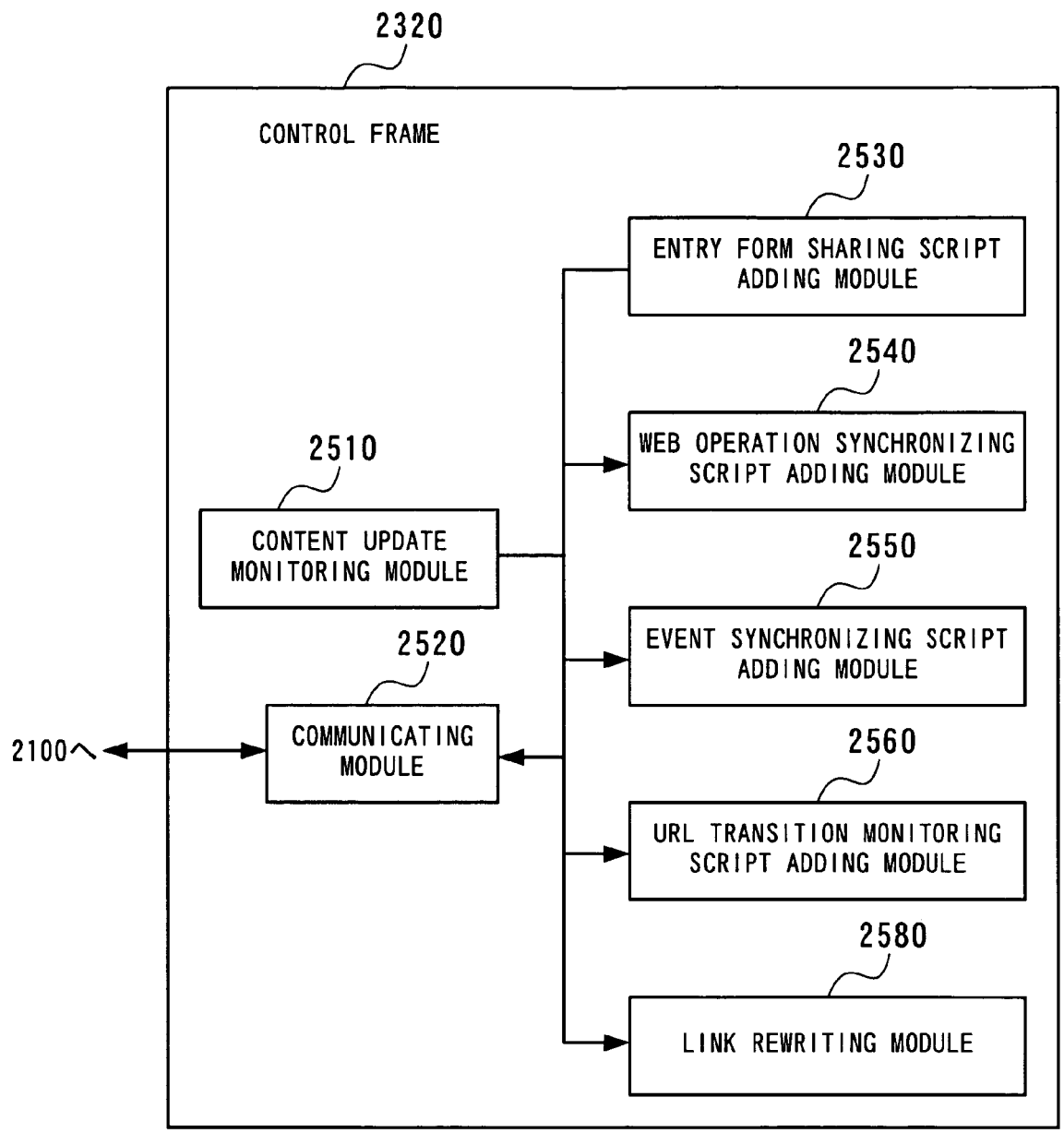
FIG. 5 is a diagram showing the modules incorporated in the control frame of an operator terminal.

FIG. 4 is a diagram showing the modules incorporated in the control frame of a customer terminal. FIG. 5 is a diagram showing the modules incorporated in the control frame of an operator terminal. FIG. 6 is a diagram showing a generating function which generates a difference notification command. FIG. 7 is a diagram showing a registering function. FIG. 8 is a diagram showing an executing function which executes a difference notification command.

Since the modules incorporated in the control frame are the same between an operator terminal 1210, 1220 and a customer terminal 1230, 1240, the description below will apply to the modules incorporated in the control frames of all the terminals. Each module operates on a digital signal processor (CPU).

The content update monitoring module 2410, 2510 checks the URL of the web page being displayed in the content frame 2210 or 2320 on the terminal periodically. On detecting an update to the URL, the content update monitoring module 2410, 2510 invokes the modules 2430, 2440, 2450, 2460, 2480, enters the frame name of the detected URL in the key field of a difference notification command 4100 and transmits the difference notification command 4100 to the push sharing server 2100 via the communicating module 2420 or 2520.

In addition, when receiving the difference notification command from the push sharing server 2100, the content update monitoring module 2410, 2510 obtains the frame name displayed in the content frame of the other terminal with which the own terminal is sharing the web page based on the key in the received difference notification command. The URL in the content frame 2210, 2320 is rewritten based on the frame name thus obtained, thereby enabling the web page to be synchronized between the terminals.

If, however, the content update monitoring module 2410 of a customer terminal 1230 and the content update monitoring module 2510 of an operator terminal 1210 individually transmit a difference notification command to the push sharing server 2100 at the same time, these terminals rewrite the URL of their own content frames individually, based on the difference notification command sent from the push sharing server 2100. As a result, a so-called ping-pong phenomenon occurs, in which the content update monitoring modules 2410 and 2510 of these terminals detect an update to the URL again and individually transmit a difference notification command containing the detection result to the push sharing server 2100. In order to prevent a ping-pong phenomenon from occurring, the push sharing server 2100 performs a process of avoiding repeated notification. This process is achieved by specifying the attribute 4100 included in a difference notification command 4100. For example, if the attribute written in the difference notification command sent from each of these terminals has a value of "1," which directs the transmission of a difference notification command to the other party terminal, then the customer managing part 2130 of the push sharing server 2100 first transmits a difference notification command to each of the terminals and then sets the attribute in the difference notification command to a value of "0" so that the same difference notification command will not be sent again.

The entry form sharing script adding module 2430, 2530 is responsible for detection of tags representing an entry form on a web page being shared between terminals; if such tags are detected, this module assigns a key to the entry form and adds an entry event function, as appropriate for the type of the entry form, to the script in the content frame 2210, 2320. The entry event function obtains the values in an entry form (which is the information that a customer writes in an entry form) that have been changed. The entry event function also inserts the obtained values into the calling function and argument field in a difference notification command, and transmits the difference notification command inserted with the obtained values to the communicating module 2420, 2520. By this entry event function, a difference notification command is transmitted from a customer terminal to an operator terminal that are sharing a web page.

The entry form sharing script adding module 2430, 2530 receives a difference notification command from the push sharing server 2100, obtains the entry form values contained in the calling function and argument field in the difference notification command, and updates the corresponding entry form values in the content frame 2210, 2320. By this, characters and other values entered in the entry form can be shared between terminals.

The web operation synchronizing script adding module 2440, 2540 adds to the script in the content frame 2210, 2320 a detection event function which detects an event representing the occurrence of a web operation, such as a scroll or resize of the content frame 2210, 2320. On detecting an event, the detection event function inserts the content of the detected event into a difference notification command to be transmitted by the communicating module 2420, 2520.

The web operation synchronizing script adding module 2440, 2540 receives a difference notification command from the push sharing server 2100, and scrolls the scroll bar provided in the content frame 2210, 2320 or resize the window size according to the content of the event detected by the detection event function from the received difference notification command, thereby achieving synchronization between the content frames of the terminals sharing a web page.

The event synchronizing script notifying module 2450, 2550 searches for drive-type events contained in the HTML data being displayed in the content frame 2210, 2320, and, on detecting the driving behavior of a found drive-type event, adds to the script in the content frame 2210, 2320 a notifying function which notifies the driving behavior of the drive-type event to other terminals. The notifying function is inserted at a position preceding the event-driven function already written in the script in the content frame.

The event synchronizing script notifying module 2450, 2550 also inserts the driving behavior of a drive-type event detected by the notifying function into a difference notification command to be transmitted by the notifying module 2420, 2520.

Furthermore, the event synchronizing script notifying module 2450, 2550 receives a difference notification command from the push sharing server 2100 and, based on the received difference notification command, drives the same drive-type event as the one driven on the other terminal with which the own terminal is sharing a web page. By this, it becomes possible to synchronize the web page between these terminals.

When a drive-type event is driven in the content frame 2210 of a customer terminal 1230, the notifying function is transmitted to an operator terminal 1210, with which the customer terminal 1230 is sharing the web page, to notify that the drive-type event has been driven. As a result, on the operator terminal 1210, the same drive-type event as the one driven in the content 2210 on the customer terminals 1230 is driven. Here again, a ping-pong phenomenon will occur because the notifying function added to the content frame 2320 on the operator terminal 1210 will also detect the driving behavior of the drive-type event and notify the detection result to the push sharing server 2100 by using a difference notification command. In order to avoid this problem, the event synchronizing script notifying module 2450, 2550 performs a process to prevent the notifying function added to the content frame of the own terminal from being invoked when receiving a notification of the driving behavior of a drive-type event from a terminal with which the own terminal is sharing a web page.

The URL transition monitoring script adding module 2460, 2560 adds to the script in the content frame 2210, 2320 a monitoring event function which monitors page transitions caused by submission of a FROM or clicking on an anchor tag. On detection of a page transition by the monitoring event function, this module generates a difference notification command which notifies the detection result. Difference notification commands are generated by a difference notification command generating function (OnSharePost). For example, the difference notification command generating function generates a difference notification command "EVAL," wherein the key is "UrlPus," the attribute is "1" (transmit to other terminals), and the calling function and argument is "command executing function DoSharePost(tagId)," as shown in FIG. 6.

The URL transition monitoring script adding module 2460, 2560 also adds to the script in the content frame 2210, 2320 a registering function which registers a generated difference notification command as a hook function. The registering function (ChangeSubmit) generates a function which calls a difference notification command generating function (OnSharePost), as shown in FIG. 7. If this generating function has not been generated, the registering function (ChangeSubmit) adds to the script in the content frame 2210, 2320 a difference notification command generating function as an event hook function.

In addition, the URL transition monitoring script adding module 2460, 2560 causes the communicating module 2420, 2520 to transmit a generated difference notification command.

Furthermore, on receiving a difference notification command from the push sharing server 2100, the URL transition monitoring script adding module 2460, 2560 first stops a call to the notifying function and then calls the event function which drives an event of the same FROM submit or anchor tag as the FROM submit or anchor tag that has been driven in the customer terminal 1230. By this, it becomes possible to achieve synchronization between the customer terminal 1230 and the operator terminal 1210.

When calling the event function which drives an event of the FROM submit or anchor tag, the URL transition monitoring script adding module 2460, 2560 stops detection of updates temporarily so that no update to the URL will be detected by the content update monitoring module 2410, 2510. The purpose of this operation is to prevent the content update monitoring module 2410, 2510 from detecting an update to the URL, thereby preventing a ping-pong phenomenon from occurring. For example, when the URL transition monitoring script adding module 2460, 2560 calls a difference notification command executing function (DoSharePost), as shown in FIG. 8, the difference notification command executing function first turns on "bStopFlag," which stops detection of updates to URL's, and then executes the same FROM submit as the FROM submit that has been detected on the customer terminal with which the own terminal is sharing a web page. By this, a ping-pong phenomenon can be prevented from occurring.

The link rewriting module 2480, 2580 rewrites a transition designation for a web page made in the content frame, if the transition designation has been made for the entire frame instead of the web page only. By this, the link rewriting module 2480, 2580 prevents the entire frame from being updated. Next, the behavior of the above-described configuration will be described with reference to FIG. 9.

Figure 9:
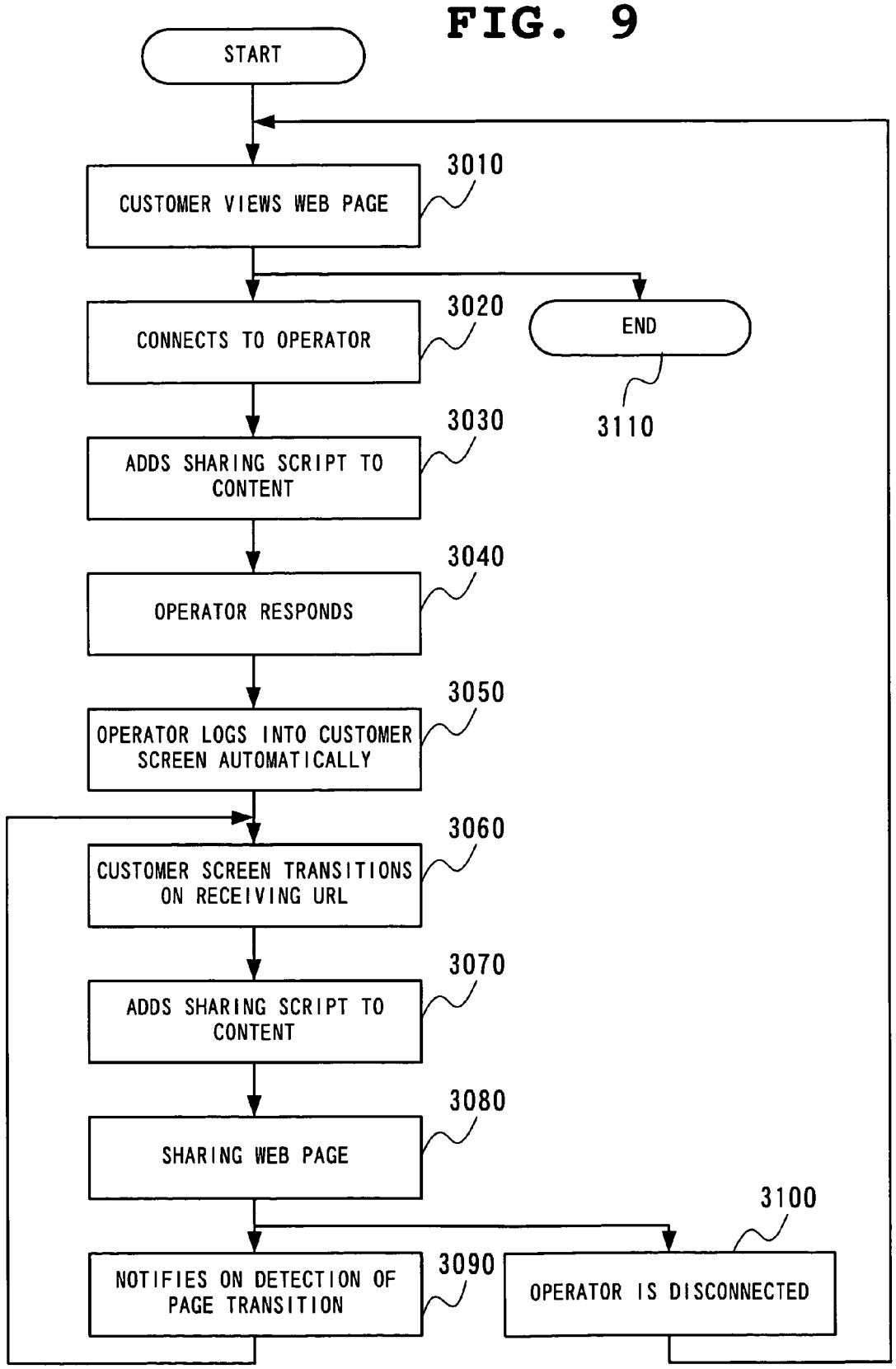
FIG. 9 is a flow chart showing the behavior performed when a customer calls an operator.

FIG. 9 is a flow chart showing the behavior performed when a customer calls an operator.

In the description below, it will be assumed that an operator terminal 1210 and a customer terminal 1230 share a web page.

A customer logs into the push server 2100 from the customer terminal 1230, using his or her own user ID. On this login, the push server 2100 causes the web server 1100 to transmit the scripts and other elements contained in the control frame and the content frame. As a result, a customer web page 2200 which consists of the control frame and the content frame is displayed on the customer terminal 1230.

Similarly, an operator logs into the push sharing server 2100 from the operator terminal 1210, using his or her own user ID. On this login, the push server 2100 causes the web server 1100 to transmit the scripts and other elements contained in the operator operating frame. As a result, the operator operating frame is displayed on the operator terminal.

The customer who has logged into the push sharing server 2100 is now viewing and freely browsing the customer web page 2200 displayed on the customer terminal 1230 (Step 3010). If there is no question or inquiry concerning the content of the customer web page, the customer stops browsing and exits the web page (Step 3110).

If there is a question or inquiry concerning the content of the customer web page, the customer presses the Connect button 2240 provided on the customer web page 2200 on the customer terminal 1230. On the pressing of the Connect button 2240, the customer terminal 1230 transmits to the push sharing server 2100 a connection request which requests a connection to the operator terminal (Step 3020).

Following this, on the customer terminal 1230, the entry form sharing script adding module 2430 detects the tags for the form to be shared between the customer terminal 1230 and the operator terminal 1210. The entry form sharing script adding module 2430 then assigns a key to the detected tags and adds to the script in the content frame 2210 an entry event function as appropriate for the type of the entry form. The web operation synchronizing script adding module 2440 adds the detection event function which detects a scroll or resize event performed in the content frame 2210. The event synchronizing script notifying module 2450 adds the notifying function, while the URL transition monitoring script adding module 2460 adds the monitoring event function, respectively. All the functions which enable sharing of a web page, etc., between the customer terminal 1230 and the operator terminal 1210 (entry event function, detection event function and monitoring event function) are now added (Step 3030).

The customer terminal 1230 then inserts detection results detected by the functions added to the script in the content frame 2210 into a difference notification command and transmits the resultant difference notification command to the push sharing server 2100.

On the push sharing server 2100, which has received the difference notification command from the customer terminal 1230, the customer managing part 2130 stores in the storing part 2160 the difference notification command received in association with the user ID of the customer terminal 1230.

On receiving the connection request from the customer terminal 1230, the customer managing part 2130 of the push sharing server 2100 requests the allocating part 2150 for allocation of an operator terminal. On receiving this request, the allocating part 2150 notifies an operator terminal 1210 currently in a waiting mode that a connection request has arrived from a customer terminal 1230.

The operator terminal 1210, which has received a notification of the occurrence of a connection request from the push sharing server 2100, enables the Respond button 2310 on the operator web page 2300, thereby prompting the operator to respond to the connection request.

On the pressing of the Respond button 2310 on the operator web page 2300 by the operator to respond to the connection request, the operator terminal 1210 notifies the push sharing server 2100 that the Respond button 2310 has been pressed (Step 3040). On the destination push sharing server 2100, the allocating part 2150 transmits to the operator terminal 1210 the user ID of the source customer terminal 1230.

On the destination operator terminal 1210 of the user ID from the push sharing server 2100, the operator logs into the push sharing server 2100, using the same user ID as the operator has received (Step 3050).

The customer managing part 2130 of the push sharing server 2100 then searches the storing part 2160 to find the difference notification command which has been associated with the same user ID as the user ID sent from the operator terminal 1210 and transmits the found difference notification command to the operator terminal 1210.

The operator terminal 1210, which has received the difference notification command from the push sharing server 2100, displays a web page in the content frame 2320 based on the difference notification command (Step 3060). By this, the web page displayed in the content frame 2210 of the customer terminal 1230 and the web page displayed in the content frame 2320 of the operator terminal 1210 are synchronized.

When the web page in the content frame 2320 is updated, the entry form sharing script adding module 2530 of the operator terminal 1230 detects and assigns a key to the tags for the entry form to be shared between the customer terminal 1230 and the operator terminal 1210, and adds an event function to the script in the content frame 2320 as appropriate for the type of the form. The web operation synchronizing script adding module 2540 adds the event function which detects a scroll or resize event performed in the content frame 2320. The event synchronizing script notifying module 2550 adds the notifying function, while the URL transition monitoring script adding module 2560 adds the monitoring event function, respectively. Thus, the script in the content frame 2320 of the operator terminal 1210 is also incorporated with the sharing script which enables sharing of a web page.

When the customer updates the web page URL in the content frame 2210 of the customer terminal 1230, the sharing script is set in the script in the updated content frame 2210 on the customer terminal 1230 (Step 3070). On detection of an update to the URL by the content update monitoring module 2410, the customer terminal 1230 writes the frame name of the found URL into the key field of a difference notification command and transmits the resultant difference notification command to the push sharing server 2100.

On the push sharing server 2100, which has received the difference notification command from the customer terminal 1230, the customer managing part 2130 stores in the storing part 2160 the received difference notification command in association with the user ID of the customer terminal 1230, and transmits the received difference notification command to the operator terminal 2130.

The operator terminal 1210, which has received the difference notification command from the push sharing server 2100, rewrites the URL in the content frame 2320 according to the frame name written into the key field of the received difference notification command (Step 3080). By this, the web page displayed in the content frame 2210 of the customer terminal 1230 and the web page displayed in the content frame 2320 of the operator terminal 1210 are synchronized.

The operator terminal 1210 then adds the sharing script to the updated script in the content frame 2320. In this way, every time the web page being displayed on the customer terminal 1230 or the operator terminal 1210 is updated, the sharing script is added to both the script in the content frame 2210 and the script in the content frame 2320.

Thereafter, the behavior from Steps 3060 to 3080 is repeated whenever a web page transition occurs in the content frame 2210 of the customer terminal 1230 (Step 3039).

If the customer wants to disconnect from the operator terminal 1210, the customer can do so by pressing again the Connect button 2240 on the customer web page of the customer terminal 1230. In response to this, the customer terminal 1230 notifies the push sharing server that the Connect button 2240 has been pressed. The customer managing part 2130 of the push sharing server 2100, which has received this notification, notifies the operator terminal 1210 that a disconnection request has arrived from the customer terminal 1230.

The operator terminal 1210, which has received the notification of the disconnection request from the push sharing server 2100, disconnects the communication with the customer terminal 1230 and deletes the web page that has been displayed in the content frame 2320 (Step 3100).

Next, referring to FIG. 10, the steps performed when a customer takes an action in the content frame 2210 of a customer terminal 1230 while the customer terminal 1230 and an operator terminal 1210 are sharing a web page will be described.

Figure 10:
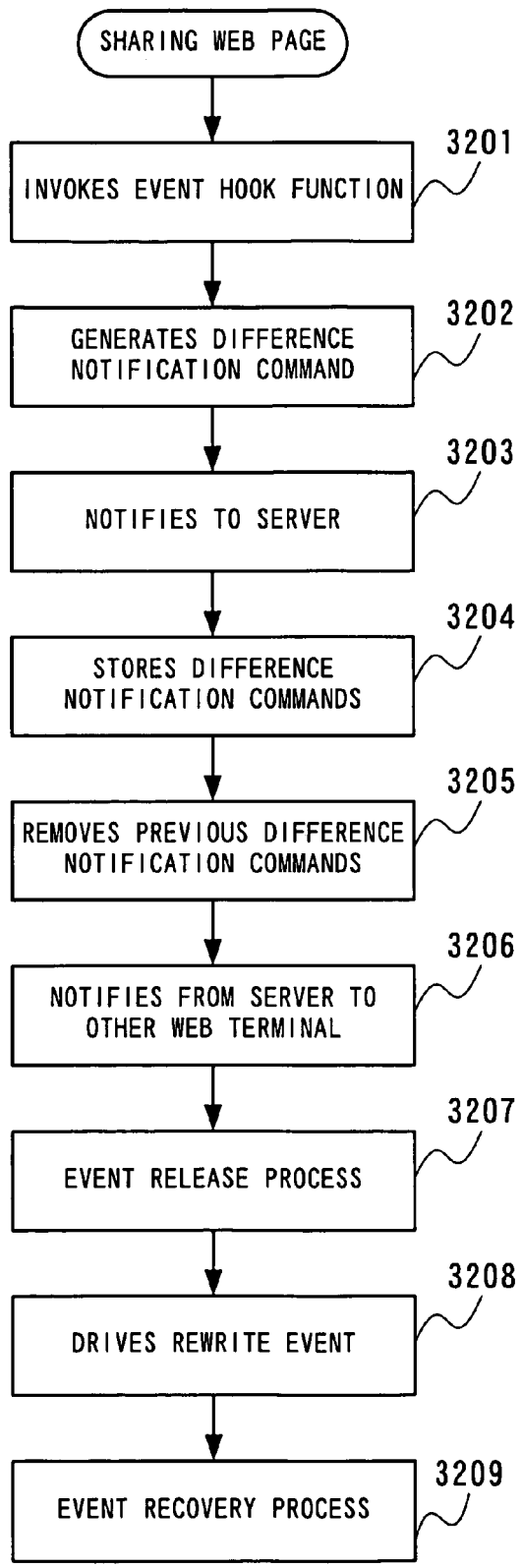
FIG. 10 is a flow chart showing the behavior performed while a web page is being shared.

FIG. 10 is a flow chart showing the behavior performed while a web page is being shared.

When a customer takes an action in the content frame 2210 of the customer terminal 1230 (i.e., when a drive-type event is driven), the functions that have been added by the above-described modules 2430, 2440, 2450, 2460 (i.e., event functions and notifying functions) are invoked on the customer terminal 1230. For example, if the customer enters characters in an entry form in the content frame 2210, the entry event function added by the entry form sharing script adding module 2430 will be invoked and obtain the characters entered in the entry form.

An invoked function then detects the content of the customer's action and generates a difference notification command inserted with the detection result and other necessary information. For example, if the customer enters characters into entry form A in the content frame 2210, the invoked function writes "entry form A" into the key field and writes the characters entered by the customer into the calling function and argument field, respectively. The invoked function also generates a difference notification command by writing into the attribute field the value "1," which directs the transmission of the difference notification command to the operator terminal (Step 3202).

The customer terminal 1230 transmits the generated difference notification command to the push sharing server 2100 (Step 3203).

On the push sharing server 2100, which has received the difference notification command from the customer terminal 1230, the customer managing part 2130 searches the storing part 2160 to find a difference notification command which contains the same key as the key written into the key field of the received difference notification command.

If such a difference notification command is not found, the customer managing part 2130 stores in the storing part 2160 the user ID of the customer terminal 1230 in association with the received difference notification command (Step 3204).

If such a difference notification command is found, the customer managing part 2130 updates the existing difference notification command into the new difference notification command (Step 3205).

The customer managing part 2130 then transmits the received difference notification command to the operator terminal 1210 via the substitute communicating part 2120 (Step 3206).

The operator terminal 1210, which has received the difference notification command from the push sharing server 2100, makes settings as necessary to cause the event synchronizing script adding module 2550 and the URL transition monitoring script adding module 2560 to prevent the invocation of the notifying functions and the event functions that have been added to the script in the content frame 2320. This process is performed in order to prevent a ping-pong phenomenon from occurring.

This operator terminal 1210 then drives an event based on the frame name and the calling function and argument written into the received difference notification command, so that the content will be the same between the content frame 2210 of the customer terminal 1230 and the content frame 2320 of the operator terminal 1230. For example, if the key field of the received difference notification command contains "entry form A" and the calling function and argument field contains characters, respectively, then the characters are input into entry form A in the content frame 2320 (Step 3208).

The event synchronizing script adding module 2550 and the URL transition monitoring script adding module 2560 release the settings that have been made to prevent the invocation of the notifying functions and the event functions (Step 3209). By this, it becomes possible to detect an event that may occur subsequently in the content frame of either terminal.

Next, the transition of a web page screen being shared between the customer terminal 1230 and the operator terminal 1210 will be described with reference to FIGS. 11 to 18.

Figure 11:
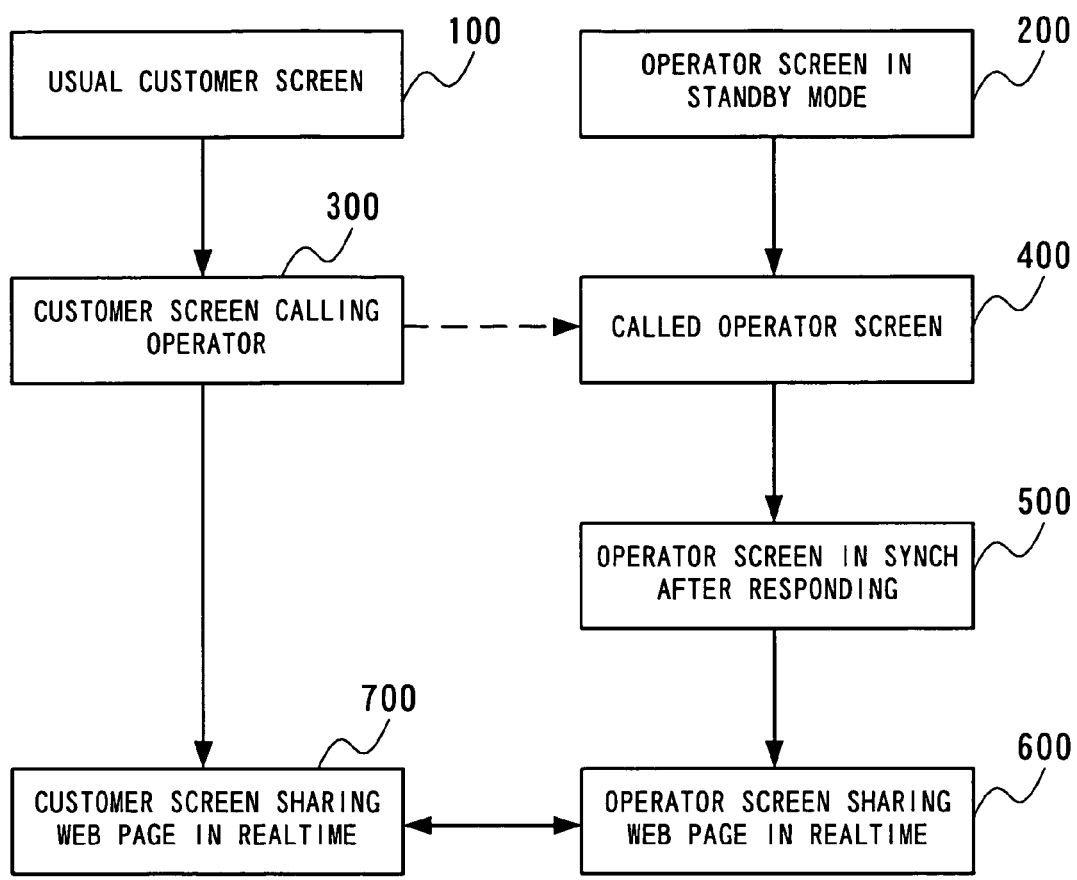
FIG. 11 is a diagram showing how the screen transitions while a web page is being shared.

FIG. 11 is a diagram showing how the screen transitions while a web page is being shared. FIGS. 12 to 18 are conceptual illustrations of a screens displayed on a customer terminal or an operator terminal.

Figure 12:
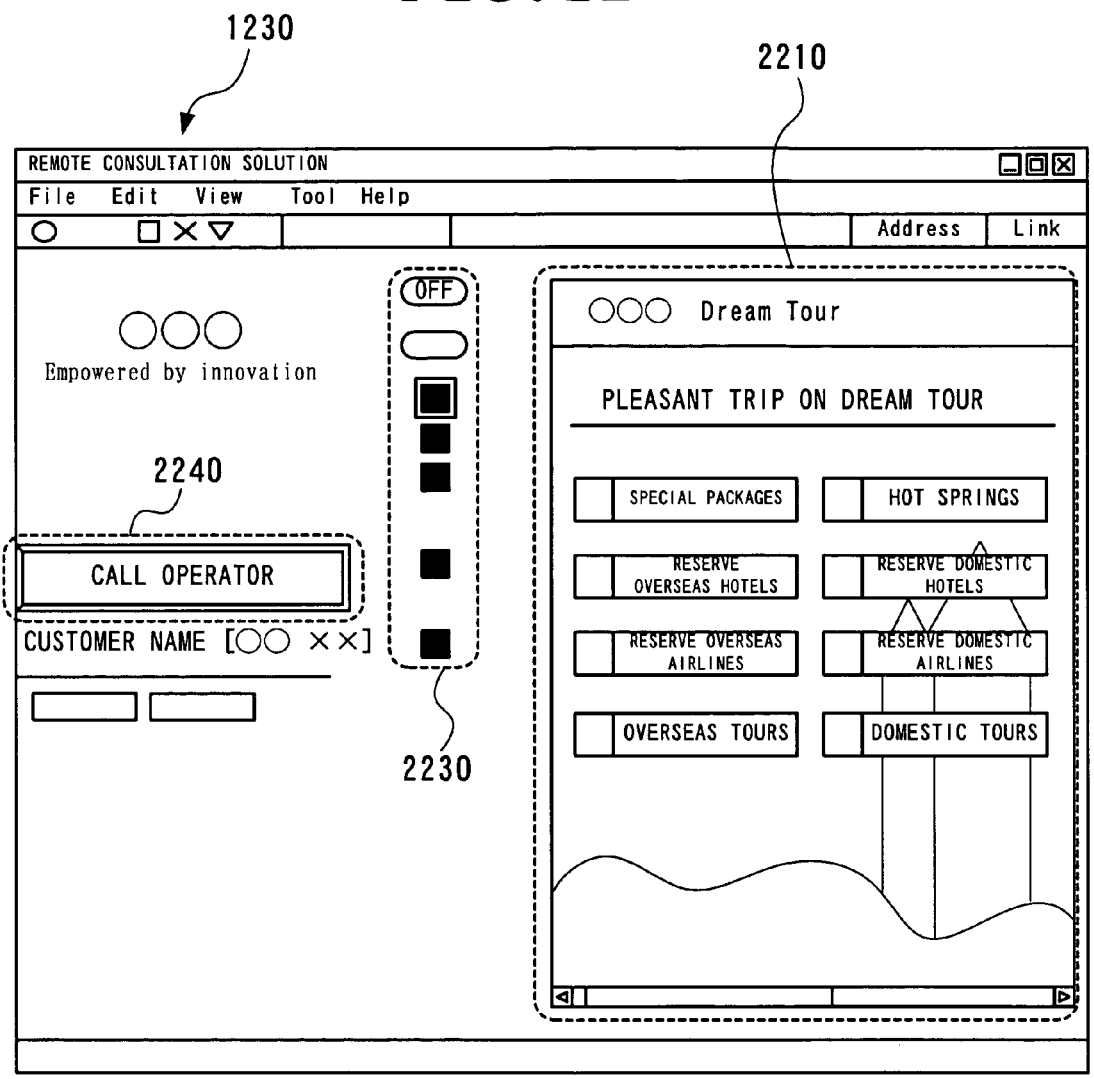
FIG. 12 is a conceptual illustration of a screen displayed on a customer terminal.

The customer terminal 1230 displays a usual execution screen, as shown in FIG. 12 (Step 100). The Call operator button 2240 on this screen corresponds to the Connect button 2240.

Figure 13:
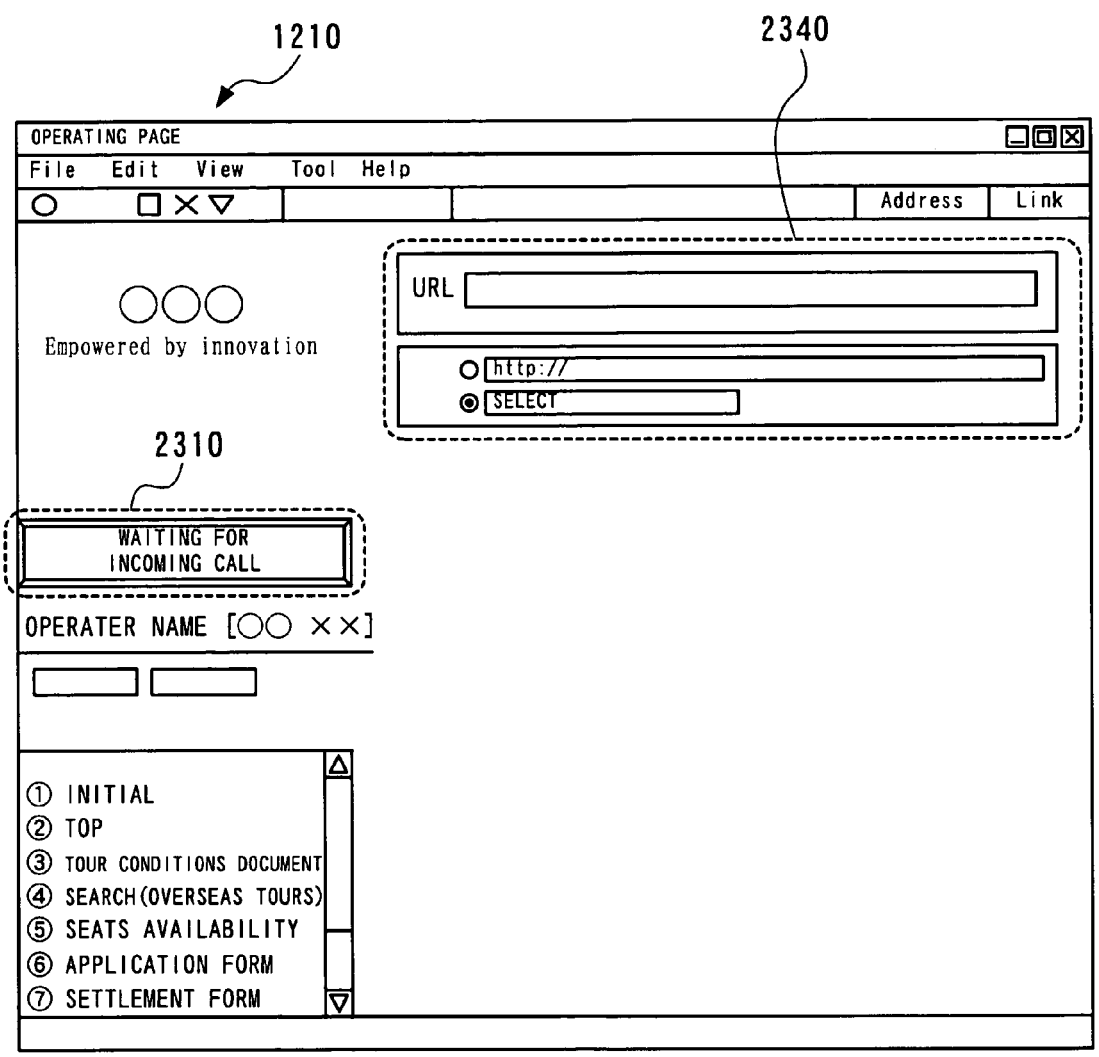
FIG. 13 is a conceptual illustration of a transmit wait screen displayed on an operator terminal.

The operator terminal 1210 displays a waiting screen, as shown in FIG. 13 (Step 200). The Waiting for incoming call button 2310 on this screen corresponds to the Respond button 2310. The content frame 2320 and the control frame 2330 are not displayed until the operator terminal is connected with a customer terminal.

Figure 14:
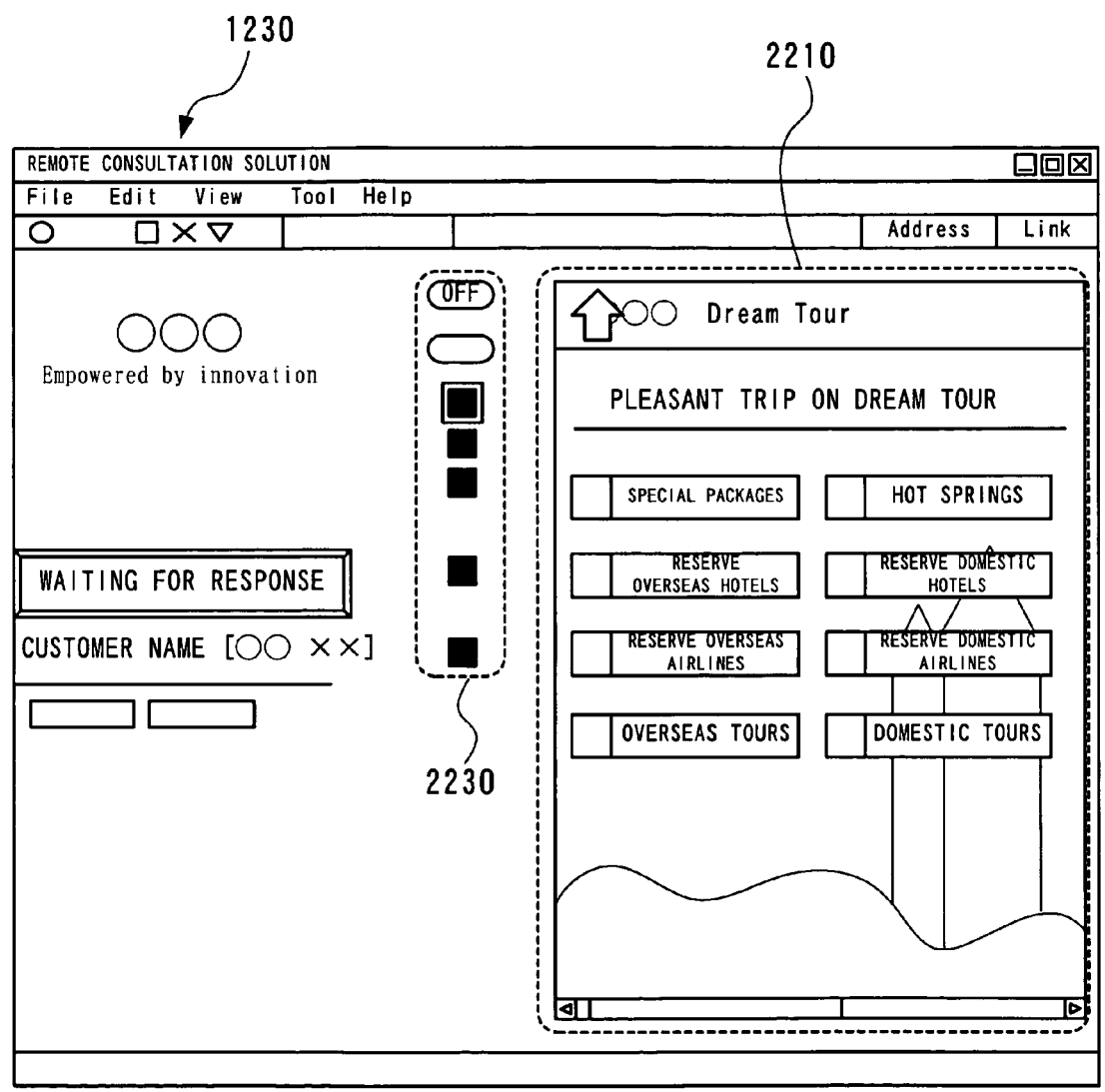
FIG. 14 is a conceptual illustration of a response wait screen displayed on a customer terminal.
Figure 15:
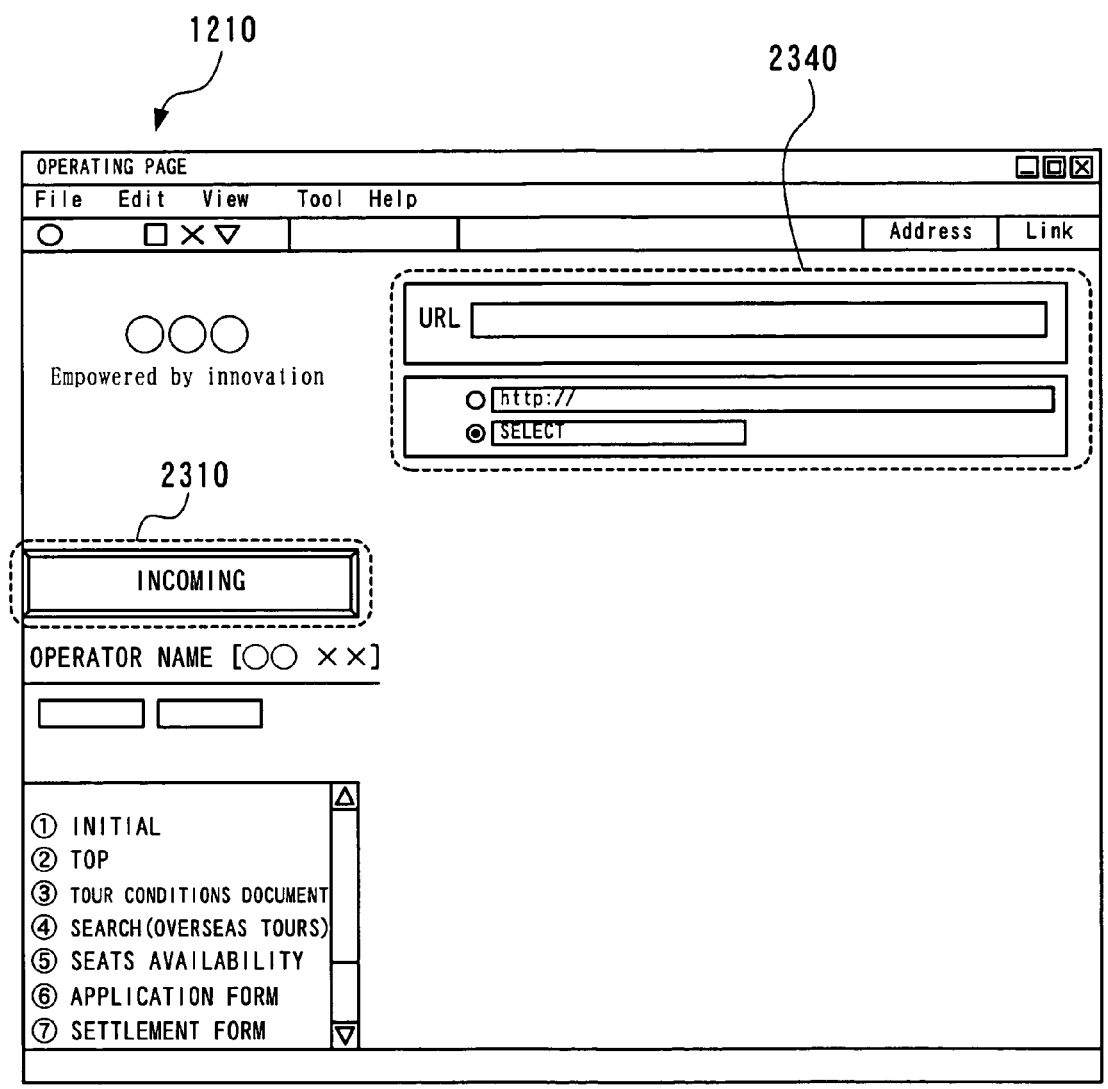
FIG. 15 is a conceptual illustration of a transmit wait screen on displayed an operator terminal.
Figure 16:
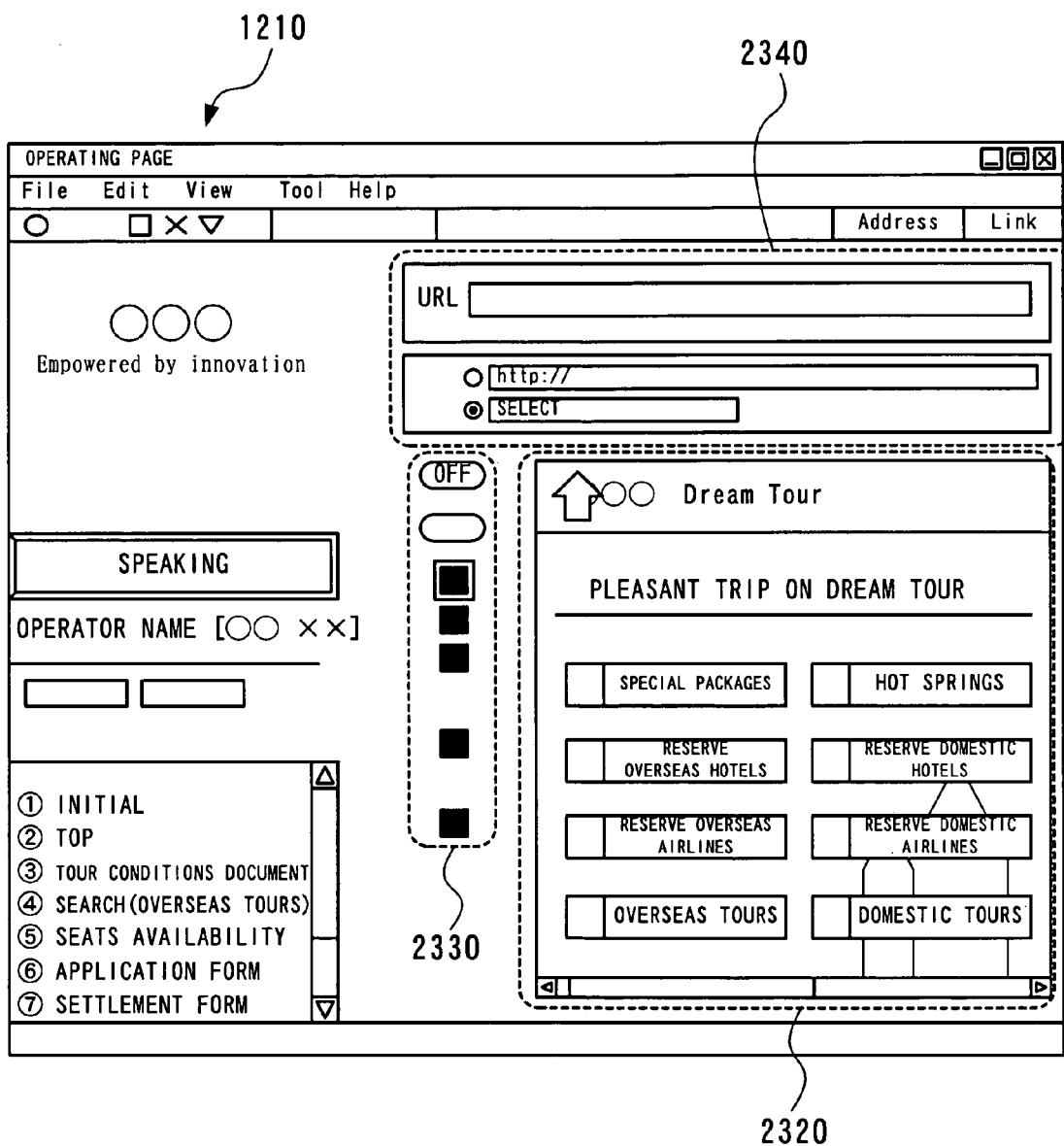
FIG. 16 is a conceptual illustration of a call screen displayed on an operator terminal.

When needing an operator's assistance, the customer presses the Call operator button 2240 (the Connect button) displayed on the customer terminal 1230. By this, the screen of the customer terminal 1230 transitions to the wait screen for a response from the push sharing server 2100, as shown in FIG. 14 (Step 300).

On detecting the pressing of the Call operator button 2240 (the Connect button), the customer terminal 1230 notifies the operator terminal 1210 of this event via the push sharing server 2100.

The operator terminal 1210, which has received a connection request from the customer terminal 1230, changes the Respond button 2310 to the Incoming button, thereby prompting the operator to respond to the connection request (Step 400).

The operator presses the Respond button 2310 on the operator web page 2300 to respond to the connection request.

On the pressing of this button, the user ID of the customer terminal is transmitted from the push sharing server 2100 to the operator terminal. The operator logs into the push sharing server 2100 using the received user ID. As a result, in the content frame 2320 of the operator terminal 1210, the web page of FIG. 16, which is the same as the web page being displayed in the content frame 2210 of the customer terminal 1230 of FIG. 14, is displayed. At this time, the control frame 2330 is also displayed (Step 500).

Figure 17:
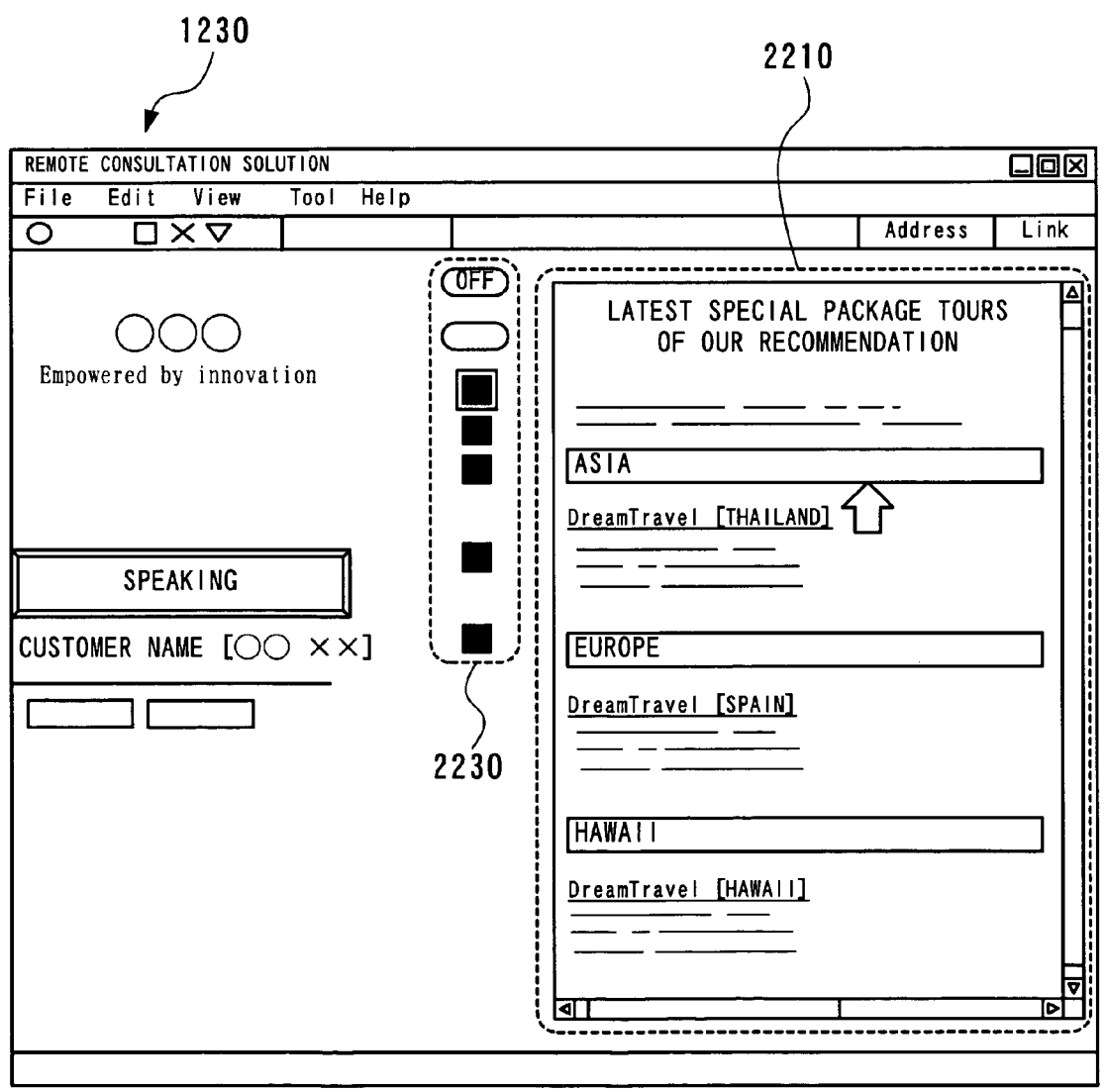
FIG. 17 is a conceptual illustration of a web page sharing screen displayed on a customer terminal.
Figure 18:
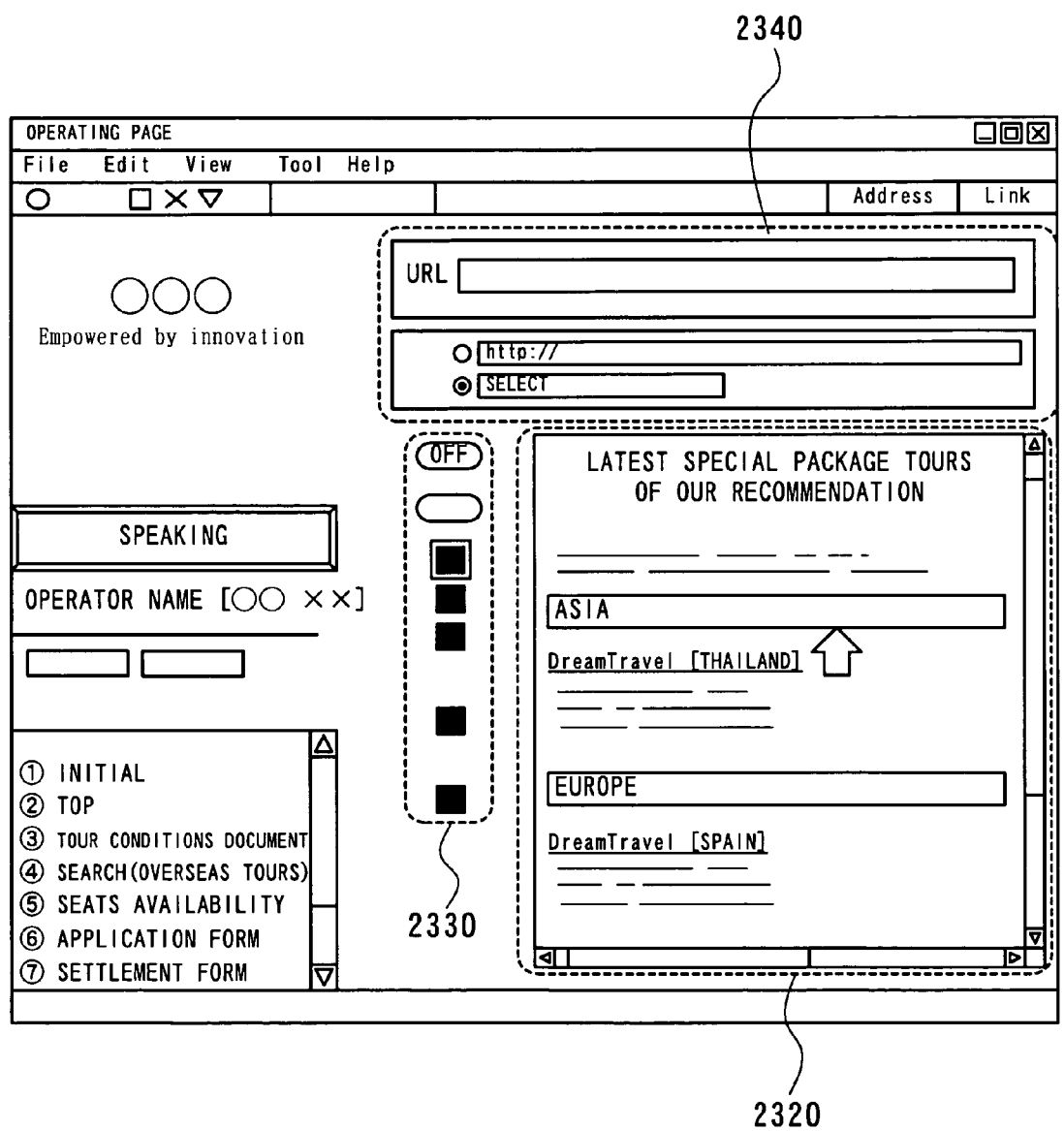
FIG. 18 is a conceptual illustration of a web page sharing screen displayed on an operator terminal.

Furthermore, based on the difference notification command sent from the push sharing server 2100, the position and other information for the scroll bar and other elements are shared between content frame 2320 of the operator terminal 1210 and the content frame 2210 of the customer terminal 1230, as shown in FIGS. 17 and 18 (Steps 600 and 700).

The second embodiment of the present invention will now be described.

The first embodiment has been described in relation to cases where one customer terminal is connected to one operator terminal.

One-to-one connections, however, would be very inconvenient when the operator who is operating an operator terminal is unable to respond to a consultation or inquiry from the customer or when the customer wants to consult with another operator.

In order to eliminate such inconvenience, the second embodiment comprises enabling connection among a plurality of operator terminals and a customer terminal.

The second embodiment will now be described in detail below.

The parts of the push sharing server that are similar to the parts of the first embodiment are assigned the same numbers and omitted from the description.

In addition to performing the same functions of the customer managing part 2130 described for the first embodiment, the customer managing part 2130 of the second embodiment receives difference notification commands from the customer communicating part 2110 and the substitute communicating part 2120, and stores in the storing part 2160 the received difference notification commands in association with the ID (e.g., user ID) of the terminal which is the sender of the difference notification command. These difference notification commands are stored in chronological order.

If a new operator terminal joins while an operator terminal is communicating with a customer terminal, the customer managing part 2130 retrieves the difference notification commands from the storing part 2160 in chronological order (the order in which these commands have been assigned to the user ID), and transmits to the new operator terminal these difference notification commands in the order of retrieval. This allows the new operator terminal to display the web page in synch with the customer terminal already in communication.

Next, the behavior of the above-described configuration will be described with reference to FIG. 19.

Figure 19:
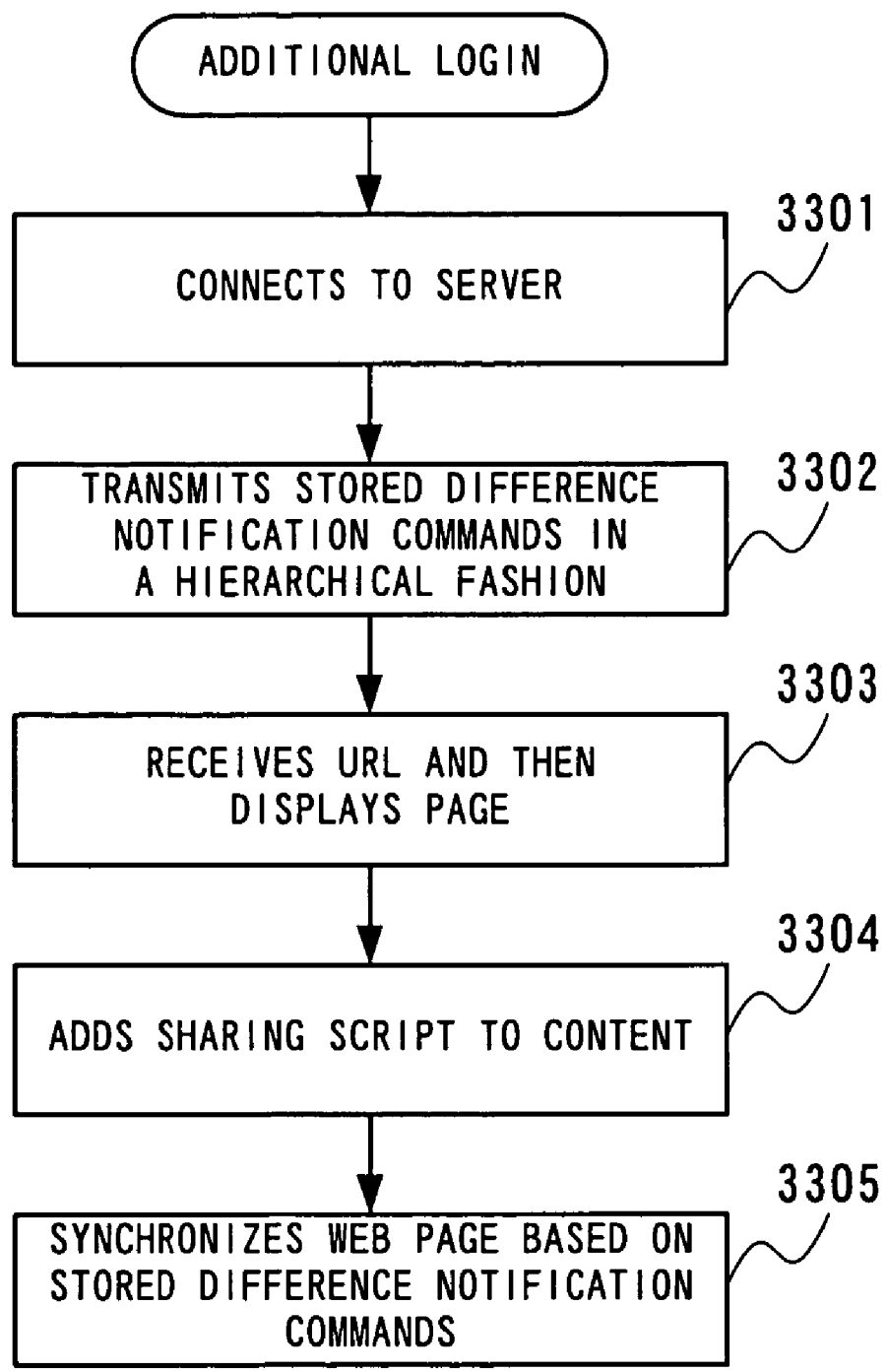
FIG. 19 is a flow chart showing the behavior performed when a new operator joins an existing interaction.

FIG. 19 is a flow chart showing the behavior performed when a new operator joins an existing interaction.

In the description below, it is assumed that the customer terminal 1230 and the operator terminal 1210 are already in communication with each other.

When operator A of the operator terminal 1210 wants to have operator B join the interaction process, operator A calls operator B from the operator terminal 1210. On detecting this call, the operator terminal 1210 transmits an operator call notification to the push sharing server 2100.

On the push sharing server 2100, which has received the operator call notification from the operator terminal 1210, the allocating part 2150 transmits the user ID of the customer terminal 1230 to an operator terminal 1220 currently in a waiting mode. On the operator terminal 1220, which has received the user ID, the operator logs into the push sharing server 2100, using the same user ID as the received user ID (Step 3301).

The push sharing server 2100 of the customer managing part 2130 then searches for a difference notification command associated with the same user ID as the user ID used for the login. The found difference notification command is transmitted to the operator terminal 1220 in the order of storage in the storing part 2160 (i.e., chronological order) (Step 3302). By transmitting the difference notification commands in the order of storage in the storing part 2160, it become possible for the operator terminal 1220 to first display the web page and then display the parts contained in the web page sequentially.

The operator terminal 1220, which has received a difference notification command from the push sharing server 2100, first displays the web page according to the received difference notification command (Step 3303).

The operator terminal 1220 then adds to the script in the content frame the same sharing script as the sharing script added by the modules on the operator terminal 1210 (Step 3304).

Following this, the operator terminal 1220 displays the parts contained in the web page based on the difference notification commands that are transmitted from the push sharing server 2100 sequentially (Step 3305).

By this, it becomes possible for the operator terminal 1220 to achieve synchronization with the web page being displayed on the customer terminal 1230 and the operator terminal 1210, which are already in communication.

Although the description above concerns cases where a new operator joins an existing interaction, it will be appreciated that this embodiment is not limited to such cases. For example, when a new customer joins an existing interaction, a web page can be shared among a plurality of customer terminals and an operator terminal by using the above-described logic.

The third embodiment will now be described.

The third embodiment comprises displaying a shared pointer on the screens of sharing terminals and enabling free drawing on these screens.

The parts of the push sharing server that are similar to the parts of the first embodiment are assigned the same numbers and omitted from the description. Since the modules incorporated in the control frame are the same between an operator terminal 1210, 1220 and a customer terminal 1230, 1240, the description below will be made for the modules incorporated in the control frames of the operator terminal 1210 and the customer terminal 1230.

Figure 20:
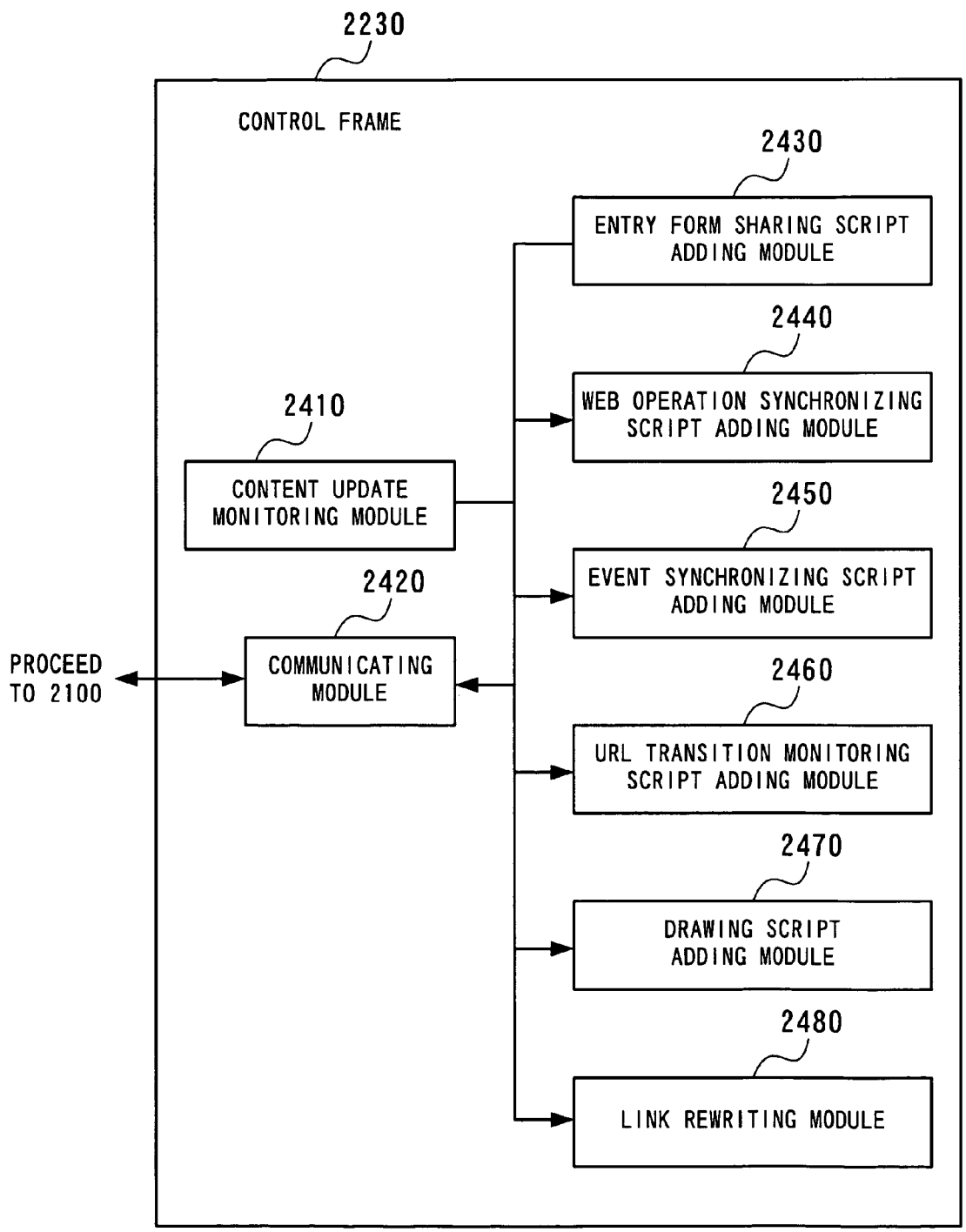
FIG. 20 is a diagram showing the modules incorporated in the control frame of a customer terminal.
Figure 21:
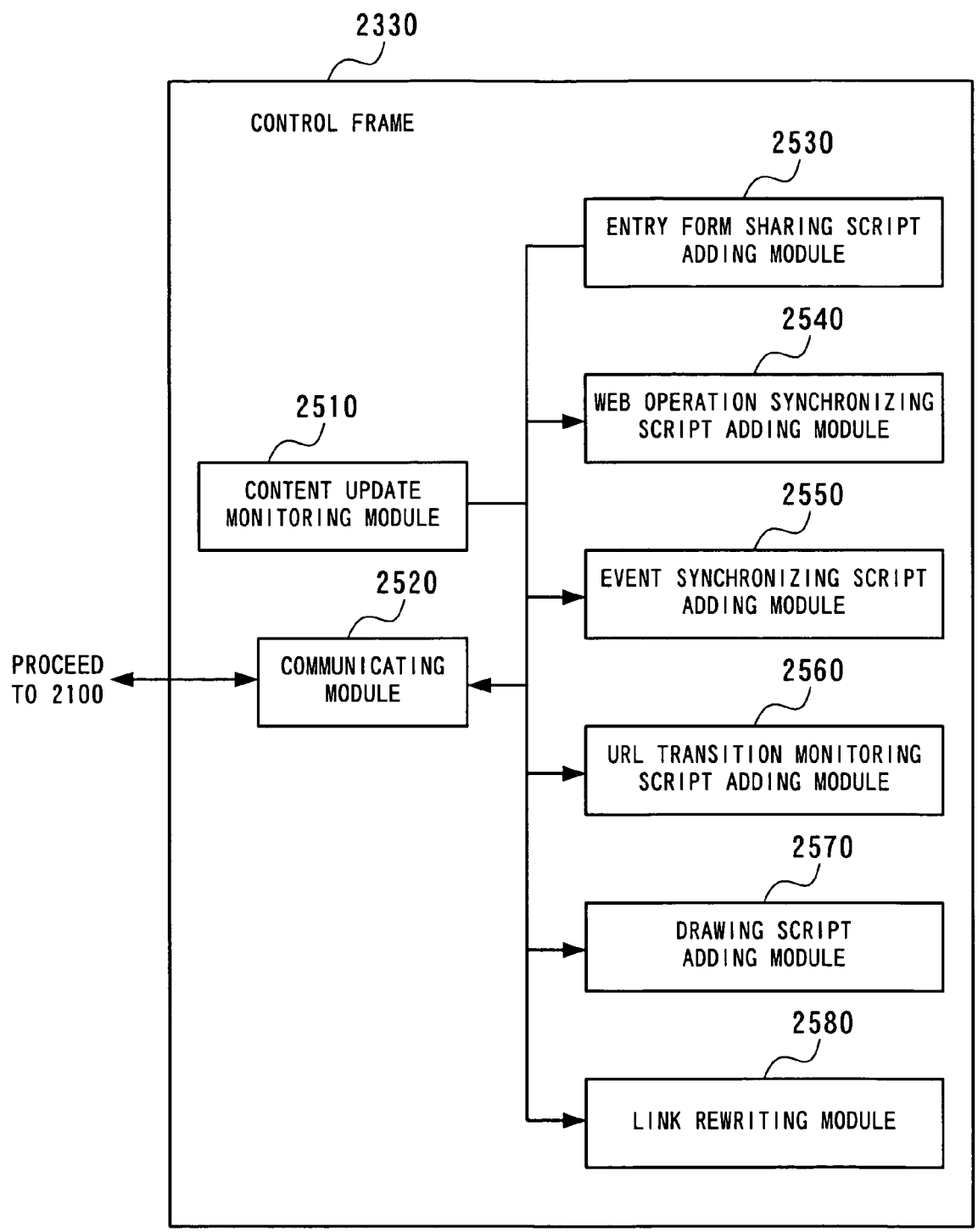
FIG. 21 is a diagram showing the modules incorporated in the control frame of an operator terminal.

FIG. 20 is a diagram showing the modules incorporated in the control frame of a customer terminal. FIG. 21 is a diagram showing the modules incorporated in the control frame of an operator terminal.

The drawing script adding module 2470, 2570 incorporates into the content frame 2210, 2320 a shared pointer to be displayed on a web page in the content frame 2210, 2320 and a tag set necessary for free drawing.

The behavior performed by the above-described configuration will now be described.

In the description below, it will be assumed that an operator terminal 1210 and a customer terminal 1230 are already sharing a web page.

When the customer wants to display a shared pointer or perform drawing operation in the content frame 2210 of the customer terminal 1230, the customer specifies use of a shared pointer or drawing mode, from the control frame 2230.

By this, on the customer terminal 1230, the drawing script adding module 2470 incorporates into the content frame 2210 a pointer that can be shared between the own terminal 1230 and the operator terminal 1210 and a tag set necessary for free drawing. For example, the drawing script adding module 2470 adds to the content frame 2210 a tag set (script) that enables free drawing on both the terminals and a tag set (script) for a shared pointer to be shared between both the terminals, as shown in FIG. 22.

The drawing script adding part 2470 transmits a difference notification command which directs that the same tag set as the added one be added to the operator terminal 1210 via the push sharing server 2100.

On the operator terminal 1210, which has received the difference notification command via the push sharing server 2100, the drawing script adding part 2570 adds to the content frame 2320 the same tag set as the one added on the customer terminal 1230.

When the customer clicks on the shared pointer on the customer terminal 1230, the ShareIconMouseDown function as shown in FIG. 22 is invoked and the movement location for the shared pointer is notified to the content frame 2320 of the operator terminal.

By this, it becomes possible to share the pointer between the customer terminal 1230 and the operator terminal 1210. In addition, the same picture as the one drawn in the content frame 2210 of the customer terminal 1230 is displayed in the content frame 2320 of the operator terminal.

Although the first to third embodiments have been described for a configuration of the push sharing server 2100 which includes as its components the customer managing part 2110, substitute communicating part 2120, customer managing part 2130, operator managing part 2140 and allocating part 2150, it will be appreciated that these embodiments are not limited to such configuration. For example, each part may be a module and realized by computerized control using a digital signal processor or the like.

Similarly, while the content update managing module, communicating module, entry form sharing script adding module, web operation synchronizing script adding module, event synchronizing script adding module, URL transition monitoring script adding module, drawing script adding module and link rewriting module have each been described as a program which operates on a digital signal processor, it will be appreciated that these modules are not limited to such form. For example, these modules may be configured as components of a customer terminal and an operator terminal, respectively.

One significant effect realized by the present invention is that a web page can be shared in real-time between terminals, without requiring any additional content building effort to modify a web page to be shared.

This is because, in the present invention, scripts which enable sharing of a web page can be incorporated into the content frames of all terminals every time the shared web page is updated.

Another significant effect realized by the present invention is that a smooth transition is ensured from an existing service to a service in which a web page is shared in real-time.

The reason for this is that a server manages difference notification commands which notify the contents of updates to web pages and transmits these difference notification commands to terminals.

The invention claimed is:

1. A system which enables real-time sharing of a web page being viewed on a plurality of terminals, comprising:
a server configured to transmit, to said plurality of terminals displaying said web page, an update detecting script which detects whether the web page being displayed on each of the plurality of terminals was updated and an updating script which updates the web page being displayed, wherein the update to the web page being displayed comprises a change in a URL of the web page; said server further configured to receive update information from a prescribed terminal among the plurality of terminals which indicates contents of updating to the web page on the prescribed terminal and transmitting said received update information to the other of the plurality of terminals displaying said web page;
said plurality of terminals each configured to receive the update detecting script and the updating script transmitted from said server and to insert said update detecting script and said updating script into said web page on each of said plurality of terminals; each of the terminals further configured to cause the received update detecting script to detect an update to the web page being displayed, the update to the web page comprising a change in a URL of the web page, and, if any, generate update information which indicates contents of the update to the web page and to transmit said update information to said server; and each of the plurality of terminals further configured to cause the updating script to update the web page based on update information generated by another of the plurality of terminals and received from said server,
wherein said server is configured to:
transmit, to said plurality of terminals, a part update detecting script, which detects an updated part among parts provided on said web page, an incorporating script, which incorporates said part update detecting script into the web page, and a part updating script which updates a part provided on the web page, wherein the updated part among parts provided on said web page comprises a scroll of the web page, a resize of the web page, or an updated of a value in an entry form on said web page; and
transmit part update information, which is received from said prescribed terminal and which indicates contents of an updated part on the web page displayed on the prescribed terminal, to said other of the plurality of terminals which are displaying the web page; and
said plurality of terminals each configured to:
receive the part update detecting script, the incorporating script and the part updating script which are transmitted from said server;
cause the incorporating script to incorporate said part update detecting script into the web page, cause said part update detecting script to detect an updated part on said web page, and to transmit to said server said part update information indicating contents of said updated part; and
cause said part updating script to update a part on the web page based on part update information received from said server,
wherein said server is further configured to:
store, in a storing part, identification information, which identifies each of said plurality of terminals, respectively, in association with corresponding update information and part update information sent from said each of said plurality of terminals;
when said prescribed terminal logs in using identification information of another of said plurality of terminals, retrieve from said storing part update information and part update information associated with said identification information used for said login; and
first transmit said retrieved update information and then transmit said retrieved part update information to said prescribed terminal.

2. The real-time web sharing system as set forth in claim 1, wherein
an update to a part provided on said web page
is a scroll or resize of said web page or an update of a value in the entry form on said web page.

3. The real-time web sharing system as set forth in claim 1, wherein
said server is configured to
when receiving a connection request which requests a connection from the prescribed terminal to another terminal, transmit said connection request to such another terminal;
when receiving from said another terminal a notification that said another terminal is ready to respond to the connection request, retrieve from said storing part the update information and part update information associated with the identification information of said prescribed terminal.

4. The real-time web sharing system as set forth in claim 1, wherein
said server is configured to
transmit a pointer script which incorporates tags for displaying a pointer to be shared on the web page between the terminals and which obtains the movement location for the pointer, and a moving script which moves the pointer; and
transmit the location information which notifies the movement location for the pointer on the web page, such information being sent from the prescribed terminal, to other terminals which are displaying the same web page as said prescribed terminal; and
said terminals each configured to
receive the pointer script and location information which are sent from said server;
cause said pointer script to incorporate the tags for sharing the pointer into the web page, obtain the location of the pointer after movement, and transmit to said server the location information which notifies the location thus obtained; and
cause said moving script to move the pointer on the web page based on said received location information.

5. A method of sharing in real-time a web page being displayed on a first terminal and a second terminal via a remote server, comprising the steps of:
said server transmitting to the first terminal an update detecting script which detects whether the web page being displayed was updated on said first terminal and transmitting to said second terminal an updating script which updates the web page being displayed on said second terminal, wherein the update to the web page comprises a change in a URL of the web page;
said first terminal receiving the update detecting script sent from said server and causing the update detecting script to detect an update to the web page comprising a change in the URL of the web page;
said second terminal receiving the updating script sent from said server;
said first terminal, if said update detecting script detects the update to the web page, generating and transmitting to said server update information which indicates contents of updating to said web page;

said server forwarding said update information sent from the first terminal to the second terminal; and said second terminal causing said received updating script to update the web page based on said update information sent from said server;

said server transmitting to the first terminal a part update detecting script which detects an updated part among parts provided on the web page and an incorporating script which incorporates said part update detecting script into the web page and transmitting to the second terminal a part updating script which updates a part provided on the web page, wherein the updated part among parts provided on the web page comprises a scroll of the web page, a resize of the web page, or an update of a value in an entry form on the web page;

said first terminal receiving said part update detecting script and said incorporating script sent from said server;

said second terminal receiving the part updating script sent from said server;

said first terminal causing said received incorporating script to incorporate said part update detecting script into said web page;

said first terminal, if the part update detecting script detects an updated part on the web page comprising a scroll of the web page, a resize of the web page, or an update of a value in an entry form on the web page, generating and transmitting to said server part update information which indicates contents of said updated part;

said server forwarding said part update information sent from said first terminal to the second terminal;

and said second terminal causing said received part updating script to update the part provided on the web page based on said part update information which has been sent from said server, wherein further comprising:

using an additional third terminal; and having the steps of:

said server storing identification information of said first terminal in association with update information and part update information received from said first terminal;

said third terminal logging into said server using the identification information of said first terminal;

said server retrieving said update information and said part update information associated with said identification information used for said login;

said server first transmitting said retrieved update information and then transmitting said retrieved part update information;

and said third terminal updating the web page based on said retrieved update information and then updating the part on the web page based on said retrieved part update information sent from said server.

6. The real-time web sharing method as set forth in claim 5, comprising the steps of:

said first terminal detecting that a Connect button which calls said second terminal has been pressed;

said first terminal, when said Connect button is pressed, notifying said server a connection request which requests a connection with said second terminal;

said server, when receiving the notification of the connection request from said first terminal, transmitting this notification to second terminal;

said second terminal, when receiving the notification of the connection request from said server, enabling a Respond button which responds to this connection request and detecting the pressing of said Respond button;

said second terminal, when detecting the pressing of said Respond button, notifying said server that the terminal is ready to respond to the connection request;

said server, when receiving the notification from said second terminal that the terminal is ready to respond to the connection request, retrieving the update information and part update information associated with the identification information of said first terminal;

said server first transmitting said retrieved update information and then transmitting said retrieved part update information; and said second terminal first updating the web page and then updating the part on the web page, based on the update information and part update information, respectively, sent from said server.

7. The real-time web sharing method as set forth in claim 5, comprising the steps of:

said server transmitting a pointer script, which incorporates tags for displaying a pointer to be shared on the web page between the terminals and which obtains the movement location for the pointer, and a moving script which moves the pointer;

said first terminal receiving the pointer script sent from said server;

said second terminal receiving the moving script sent from said server;

said first terminal causing said received pointer script to incorporate the tags of the pointer to be shared between the terminals into said web page;

said first terminal causing said pointer script to obtain the movement location for said pointer and transmit the location information thus obtained to said server;

said server forwarding the location information sent from said first terminal to said second terminal; and said second terminal causing said moving script to move the pointer being displayed on said web page, based on the location information sent from said server.

* * * * *